US006988391B2

(12) United States Patent
Amano et al.

(10) Patent No.: US 6,988,391 B2

(45) Date of Patent: Jan. 24, 2006

(54) FUEL VAPOR LEAKAGE INSPECTION APPARATUS

(75) Inventors: Noriyasu Amano, Gamagori (JP); Naoya Kato, Ama-gun (JP); Hideaki Itakura, Nagoya (JP); Masao Kano, Gamagori (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 11/142,330

(22) Filed: Jun. 2, 2005

(65) Prior Publication Data

US 2005/0217348 A1 Oct. 6, 2005

Related U.S. Application Data

(62) Division of application No. 10/662,481, filed on Sep. 16, 2003, now Pat. No. 6,945,093.

(30) Foreign Application Priority Data

Sep. 18, 2002 (JP) ............................. 2002-271205
Feb. 5, 2003 (JP) ............................... 2003-28258

(51) Int. Cl.
*G01M 3/04* (2006.01)

(52) U.S. Cl. ........................................................ 73/49.7

(58) Field of Classification Search .................... 73/40, 73/40.5 R, 49.2, 49.7, 118.1; 123/519, 520, 123/521; 702/51
See application file for complete search history.

(56) References Cited

U.S. PATENT DOCUMENTS

| | | | | |
|---|---|---|---|---|
| 5,347,971 | A | 9/1994 | Kobayashi et al. | |
| 5,467,641 | A * | 11/1995 | Williams et al. | 73/49.7 |
| 5,606,121 | A * | 2/1997 | Blomquist et al. | 73/118.1 |
| 5,750,888 | A * | 5/1998 | Matsumoto et al. | 73/118.1 |
| 5,890,474 | A | 4/1999 | SchNaibel et al. | |
| 5,957,113 | A * | 9/1999 | Masaki et al. | 123/518 |
| 6,305,361 | B1 | 10/2001 | Takaku et al. | |
| 6,550,315 | B2 | 4/2003 | Streib | |
| 6,679,111 | B2 | 1/2004 | Shigihama et al. | |
| 6,848,298 | B2 | 2/2005 | Miyahara et al. | |
| 2001/0052292 | A1 * | 12/2001 | Ito | 96/134 |
| 2002/0170550 | A1 * | 11/2002 | Mitsutani | 123/674 |

FOREIGN PATENT DOCUMENTS

JP 11-351078 12/1999

* cited by examiner

*Primary Examiner*—Charles Garber
(74) *Attorney, Agent, or Firm*—Nixon & Vanderhye P.C.

(57) ABSTRACT

A fuel vapor leakage inspection apparatus utilizes a fuel tank, an adsorption container which houses an adsorbent for adsorbing fuel vapor generated in the fuel tank, and an exhaust device for communicating between the adsorption container and an intake pipe. Furthermore, the apparatus utilizes a pressure means that pressurizes or depressurizes a fuel vapor path formed from the fuel tank through the adsorption container to the exhaust device. A leakage detection means detects leakage from the fuel vapor path after the fuel vapor path is pressurized or depressurized by the pressure means while a calculation means calculates an amount of fuel vapor adsorbed, and a control means determines if the pressure means should execute leakage inspection of the fuel vapor path in accordance with the amount of the fuel vapor calculated by the calculation means.

3 Claims, 31 Drawing Sheets

FUEL VAPOR LEAKAGE INSPECTION APPARATUS

This is a Divisional of application Ser. No. 10/662,481, filed Sep. 16, 2003, now U.S. Pat. No. 6,945,093.

CROSS REFERENCE TO RELATED APPLICATIONS

This application is based upon, claims the benefit of priority of, and incorporates by reference, the contents of Japanese Patent Applications No. 2002-271205 filed Sep. 18, 2002, and No. 2003-28258 filed Feb. 5, 2003.

BACKGROUND OF THE INVENTION

1. Field of the Invention

The present invention relates to a fuel vapor leakage inspection apparatus.

2. Description of the Related Art

Generally, a system is known for processing fuel vapor using an adsorbent configured to adsorb fuel vapor generated in a fuel tank. For example, granular activated carbon can be housed in an adsorption container, and the container will exhaust the fuel vapor adsorbed by the adsorbent to an intake pipe by means of a negative pressure in the intake pipe. The fuel vapor exhausted into the intake pipe is combusted in a combustion chamber. If leakage occurs in the fuel vapor processing system, the fuel vapor flows out into the atmosphere. Therefore, in such a case, it is necessary to inspect for the occurrence of leakage in the fuel vapor processing system. As a leakage inspection apparatus for the fuel vapor processing system, an apparatus for pressurizing or depressurizing a sealed fuel vapor path with a pump so as to detect the occurrence of leakage depending on a change in pressure after pressurization or depressurization has been known (for example, see Japanese Patent Laid-Open Publication No. Hei 11-351078).

In addition, other apparatuses for detecting the leakage based on a change in pump characteristics while the pump is being driven are known (for example, Japanese Patent Laid-Open Publications No. Hei 10-90107 and No. 2002-4959). However, if the leakage inspection is executed by pressurizing or depressurizing the sealed fuel vapor path by using pressure means such as a pump when the adsorbability of the adsorbent is lowered, for example, in the case where the adsorbent housed within the adsorption container is deteriorated, in the case where the adsorbent adsorbs a large amount of fuel vapor, and the like, the following problems occur.

In the case where the fuel vapor path is pressurized to execute the leakage inspection, when the fuel vapor path is depressurized after the pressurization of the fuel vapor path so as to exhaust the air in the fuel vapor path into the atmosphere, the fuel vapor present in the fuel vapor path is sometimes not adsorbed by the adsorbent but flows out into the atmosphere. On the other hand, in the case where the fuel vapor path is depressurized to execute the leakage inspection, when the air in the fuel vapor path is exhausted into the atmosphere so as to depressurize the fuel vapor path, all the fuel vapor present in the fuel vapor path sometimes cannot be adsorbed by the adsorbent and flows out into the atmosphere. Therefore, even if the leakage does not occur in the fuel vapor path itself, when the adsorbability of the adsorbent is lowered, there is a possibility that the fuel vapor flows out into the atmosphere when the leakage inspection is executed.

In the case where the leakage from the fuel vapor path is determined based on a path pressure in the fuel vapor path measured by pressurizing or depressurizing the fuel vapor path, if the fuel vapor adsorbed in a canister flows out to the atmosphere by an air flow generated by the pressurization or the depressurization, the pressure in the fuel vapor path changes in accordance with a concentration of the fuel vapor that flows out. Therefore, the fuel vapor leakage inspection apparatus suffers from the problem that the occurrence of leakage from the fuel vapor path cannot be precisely determined.

SUMMARY OF THE INVENTION

In view of the above problems, the present invention has an object of providing a fuel vapor leakage inspection apparatus for stopping leakage inspection when the adsorbability of an adsorbent is lowered so as to prevent fuel vapor from flowing out into the atmosphere during the leakage inspection. The present invention has another object of providing a fuel vapor leakage inspection apparatus for preventing the fuel vapor from flowing out into the atmosphere during the leakage inspection, regardless of the adsorbability of the adsorbent.

The present invention has a further object of providing a fuel vapor leakage inspection apparatus for stopping the leakage determination when the adsorbability of the adsorbent is lowered. The present invention has yet another object of providing a fuel vapor leakage inspection apparatus for correcting the amount of leakage from the fuel vapor path in accordance with the amount of the fuel vapor flowing out to the atmosphere so as to determine the occurrence of leakage.

According to a fuel vapor leakage inspection apparatus_as set forth in a first aspect of the present invention, the amount of fuel vapor adsorbed by an adsorbent is calculated by a calculation means so as to determine whether or not to operate a pressure means. That is, whether or not to execute leakage inspection based on the calculated amount of the fuel vapor is determined. When a large amount of the fuel vapor is adsorbed by the adsorbent to lower the adsorbability of the adsorbent, the leakage inspection is stopped without pressurizing or depressurizing the sealed fuel vapor path by the pressure means. Thus, the fuel vapor can be prevented from flowing out into the atmosphere during the leakage inspection.

Generally, it is known that there is a correlation between the amount of the fuel vapor adsorbed by the adsorbent and a concentration of the fuel vapor exhausted from an adsorption container into an intake pipe by a negative pressure. As the amount of the fuel vapor adsorbed by the adsorbent increases, the concentration of the fuel vapor exhausted from the adsorption container into the intake pipe becomes higher. On the contrary, as the amount of the fuel vapor adsorbed by the adsorbent decreases, the concentration of the fuel vapor exhausted from the adsorption container into the intake pipe becomes lower.

In order to control the air-fuel ratio of an internal combustion engine, hereinafter referred to simply as an engine, when the fuel vapor is exhausted into the intake pipe, the amount of deviation between a theoretical air-fuel ratio and an actual air-fuel ratio, obtained by exhausting the fuel vapor into the intake pipe, is generally detected using an exhaust oxygen sensor or an A/F sensor for detecting the air-fuel ratio. The amount of the fuel vapor or the concentration of the fuel vapor exhausted into the exhaust pipe is calculated based on the amount of deviation between the theoretical air-fuel ratio and the actual air-fuel ratio so as to control the amount of a fuel to be injected.

According to the fuel vapor leakage inspection apparatus according to a second aspect of the present invention, the amount of fuel vapor adsorbed by the adsorbent is calculated based on the previous amount or concentration of the fuel vapor exhausted into the intake pipe or the amount of deviation in the air-fuel ratio generated by exhausting the fuel vapor. In the case where the amount of the fuel vapor adsorbed by the adsorbent is large enough to lower the adsorbability of the adsorbent, the operation of the pressure means is stopped to prevent the fuel vapor from flowing out into the atmosphere.

If a time period from the stopping of an engine to the execution of leakage inspection is long, the adsorbent adsorbs the fuel vapor generated in the fuel tank even when the engine is stopped. Therefore, the amount of the fuel vapor adsorbed by the adsorbent prior to execution of leakage inspection cannot be precisely calculated based on the amount of the fuel vapor exhausted into the intake pipe while the engine is in operation.

According to a fuel vapor leakage inspection apparatus according to a third aspect of the present invention, the amount of the fuel vapor adsorbed by the adsorbent is calculated based on at least one of the amount of fuel in the fuel tank, a fuel temperature, and the engine stop time. In this manner, even if an interval from the engine stop to the execution of the leakage inspection is long, the amount of the fuel vapor adsorbed by the adsorbent prior to execution of leakage inspection can be precisely calculated. In the case where the calculated amount of the fuel vapor is large and therefore the adsorbability of the adsorbent is lowered, the operation of the pressure means is stopped to prevent the fuel vapor from flowing out into the atmosphere.

When fuel is fed to the fuel tank, fuel vapor is generated. As a result, the adsorbent adsorbs a large amount of the fuel vapor. According to a fuel vapor leakage inspection apparatus according to a fourth aspect of the present invention, when fuel feeding the fuel tank is detected, it is determined that a large amount of the fuel vapor is adsorbed by the adsorbent to stop the leakage inspection. After the fuel vapor adsorbed by the adsorbent is exhausted into the intake pipe to decrease the amount of the fuel vapor adsorbed by the adsorbent while the leakage inspection is being stopped, the leakage inspection becomes executable.

According to a fuel vapor leakage inspection apparatus according to a fifth aspect of the present invention, after fuel is fed to the fuel tank, leakage inspection is stopped until a vehicle runs under predetermined conditions so as to be capable of exhausting the fuel vapor adsorbed by the adsorbent into the intake pipe. In this manner, the leakage inspection is prevented from being executed while the adsorbent is adsorbing a large amount of the fuel vapor.

According to a fuel vapor leakage inspection apparatus according to a sixth aspect of the present invention, when the adsorbability of the adsorbent is lowered so that the fuel vapor flows out to the atmosphere, the leakage inspection is stopped. Therefore, the fuel vapor is prevented from being further released to the atmosphere due to the leakage inspection.

According to a fuel vapor leakage inspection apparatus according to a seventh aspect of the present invention, a second adsorbent for adsorbing the fuel vapor is provided upstream of a throttle device provided in the intake pipe. The intake pipe positioned between the second adsorbent and a combustion chamber of the engine and the atmosphere side of the pressure means are connected with each other through a connection pipe. Even in a case where the fuel vapor flows out into the atmosphere during the leakage inspection, the fuel vapor flows out through the connection pipe into the intake pipe so as to be adsorbed by the second adsorbent. Therefore, even when the engine is stopped, the pressure means can be operated to execute the leakage inspection.

According to a fuel vapor leakage inspection apparatus according to an eighth aspect of the present invention, the atmosphere side of the pressure means and a sealed container are connected with each other. In such a configuration, even if the fuel vapor flows out from the pressure means and toward the atmosphere during leakage inspection, the fuel vapor flowing out from the pressure means is stored in the sealed container. Therefore, even in a case where the fuel vapor begins flowing toward the atmosphere, the fuel vapor can be prevented from flowing out into the atmosphere so as to execute the leakage inspection.

According to a fuel vapor leakage inspection apparatus according to a ninth aspect of the present invention, pressure in the sealed container is made negative prior to pressurization or depressurization of the fuel vapor path by the pressure means. This pressurization or depressurization ensures that the fuel vapor can be stored in the sealed container.

According to a fuel vapor leakage inspection apparatus according to a tenth aspect of the present invention, since pressure in the sealed container is made negative by the pressure means used for the leakage inspection, it is not necessary to prepare additional or auxiliary means for making the pressure in the sealed container negative.

According to a fuel vapor leakage inspection apparatus according to an eleventh aspect of the present invention, since the pressure in the sealed container is made negative by a negative pressure of the intake pipe, means for making the pressure in the sealed container negative is not required.

According to a fuel vapor leakage inspection apparatus according to a twelfth aspect of the present invention, the sealed container increases or decreases its volume in accordance with the amount of the fuel vapor stored in the container. Even if means for delivering the fuel vapor to the sealed container is not provided, the fuel vapor can be stored as the result of increasing or decreasing the volume of the sealed container.

If a path pressure in the fuel vapor path is measured while the fuel vapor is flowing out to the atmosphere so as to execute the leakage inspection, for example, even leakage holes of the same size have different measured pressure values depending on the concentration of the fuel vapor. Thus, if the fuel vapor flows out to the atmosphere, the occurrence of leakage from the fuel vapor path cannot be precisely determined.

According to a fuel vapor leakage inspection apparatus according to a thirteenth aspect of the present invention, in the case where there is a possibility that leakage may occur from the fuel vapor path as a result of comparison between a first reference orifice pressure measured by pressurizing or depressurizing a reference orifice and a path pressure of the fuel vapor path measured by pressurizing or depressurizing the fuel vapor path after the measurement of the first reference orifice pressure, the reference orifice is pressurized or depressurized again to measure a second reference orifice pressure. Then, the first reference orifice pressure and the second reference orifice pressure are compared with each other. Fuel vapor is generated from the fuel tank when leakage inspection is executed by pressurizing or depressurizing the fuel vapor path. If the adsorbent is not capable of adsorbing all the fuel vapor, the fuel vapor flows out from the adsorption container to the atmosphere. When air containing the fuel vapor passes through the reference orifice, the reference orifice pressure in the reference orifice changes depending on the concentration of the fuel vapor. By comparing the first reference orifice pressure, which is measured prior to the pressurization or the depressurization of the fuel vapor path, and the second reference orifice pressure, which is measured when there is a possibility that the fuel vapor may be present in the vicinity of the reference orifice due to the pressurization or the depressurization, it is possible to determine whether the fuel vapor flows out from the adsorption container to the atmosphere when the leakage inspection is executed by pressurizing or depressurizing the fuel vapor path.

According to the fuel vapor leakage inspection apparatus according to a thirteenth aspect of the present invention, when a certain or larger amount of the fuel vapor flows out from the adsorption container to the atmosphere, it is determined that the measured path pressure in the fuel vapor path is imprecise. Therefore, the leakage determination is stopped.

According to a fuel vapor leakage inspection apparatus according to a fourteenth aspect of the present invention, in the case where there is a possibility that leakage may occur from the fuel vapor path as a result of comparison between the first reference orifice pressure obtained by pressurizing or depressurizing the reference orifice and the path pressure in the fuel vapor path, obtained by pressurizing or depressurizing the fuel vapor path after the measurement of the first reference orifice pressure, the second reference orifice pressure, which is obtained by pressurizing or depressurizing the reference orifice again, and the first reference orifice pressure are compared with each other. After the path pressure, which is measured by pressurizing or depressurizing the fuel vapor path, is corrected in accordance with the amount of a change in pressure between the first reference orifice pressure and the second reference orifice pressure, the occurrence of leakage from the fuel vapor path is determined. The occurrence of leakage can be precisely determined without stopping the leakage determination.

According to a fuel vapor leakage inspection apparatus according to a fifteenth aspect of the present invention, in the case where it is determined that there is a possibility that the leakage may occur from the fuel vapor path, based on the path pressure in the fuel vapor path, measured by pressurizing or depressurizing the fuel vapor path, the concentration of the fuel vapor on the atmosphere side of the adsorbent is measured. When the concentration of the fuel vapor is a predetermined value or larger, the leakage determination is stopped.

According to a fuel vapor leakage inspection apparatus according to a sixteenth aspect of the present invention, after the path pressure of the fuel vapor path obtained by pressurizing or depressurizing the fuel vapor path is corrected in accordance with the concentration of the fuel vapor on the atmosphere side of the adsorbent, the occurrence of leakage from the fuel vapor path is determined. Therefore, the occurrence of leakage can be precisely determined without stopping the leakage determination.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments with reference to the accompanying drawings is merely exemplary in nature and is in no way intended to limit the invention, its application, or uses.

(First Embodiment)

Figure 1:
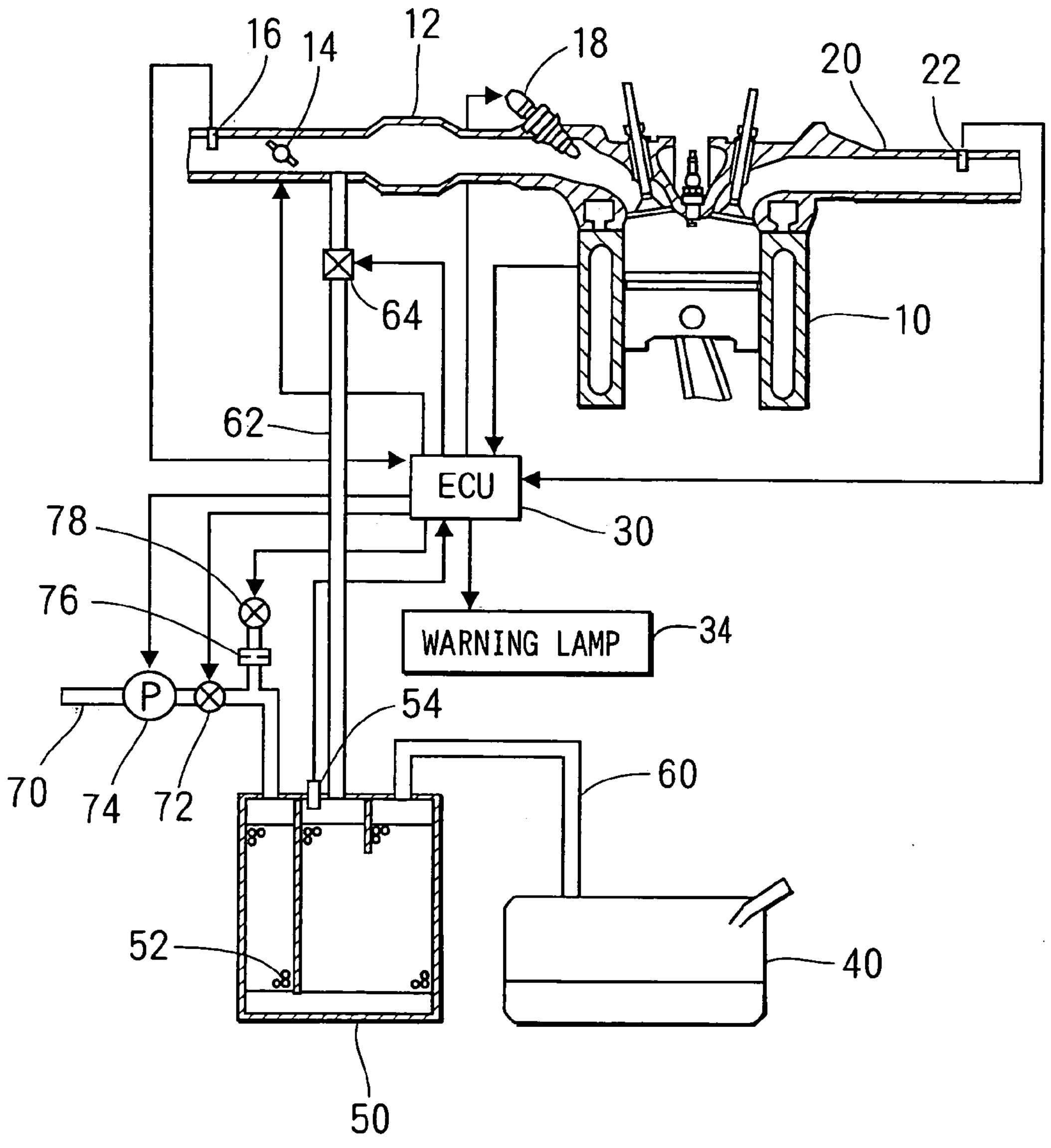
FIG. 1 is a partial configuration view and a partial cross-sectional view of a fuel vapor leakage inspection apparatus according to a first embodiment of the present invention.

A fuel vapor leakage inspection apparatus according to the first embodiment of the present invention is shown in FIG. 1. The fuel vapor leakage inspection apparatus serves to inspect if the leakage occurs in a fuel vapor processing system. The fuel vapor leakage processing system includes an intake pipe 12, a fuel tank 40, a canister 50, and a purge valve 64. A fuel vapor generated in the fuel tank 40 is adsorbed by an adsorbent 52 such as granular activated carbon housed within the canister 50, which serves as an adsorption container. A fuel vapor path is constituted by spaces in the fuel tank 40, in the canister 50 and in pipes 60, 62. During engine operation, the purge valve 64, serving as an exhaust device, and an open/close valve 72 are opened, the atmosphere passes through the pump 74 and the open/close valve 72 and is introduced into the canister 50. The fuel vapor adsorbed by the adsorbent 52 is exhausted into the suction pipe 12 by a negative pressure in the suction pipe 12, which is positioned downstream of a throttle device 14.

The fuel vapor leakage inspection device includes an air-fuel ratio sensor 22, an electronic control unit (hereinafter, abbreviated as ECU) 30, a pressure sensor 54, a pump 74, a reference orifice 76, and an orifice valve 78. A flow meter 16 measures the amount of drawn air flowing through the intake pipe 12. The air-fuel ratio sensor 22 provided in an exhaust pipe 20 measures an air-fuel ratio in an exhaust gas. An ignition signal, the number of engine revolutions, an engine cooling water temperature, the opening position of the accelerator, the amount of drawn air, and an air-fuel ratio are input from the flowmeter 16, the air-fuel ratio sensor 22, and the like into the ECU 30, which functions as a control means so as to control the opening position of the throttle device 14, the amount of fuel injection from the injector 18, and the like.

The air-fuel ratio sensor 22 and the ECU 30 constitute a calculation means. An exhaust oxygen sensor may be-used instead of the air-fuel ratio sensor 22. The pressure sensor 54 serving as a leakage detection means for measuring pressure in the fuel vapor path is provided for the canister 50. Instead of providing the pressure sensor 54 for the canister 50, the pressure sensor 54 may be provided for the fuel tank 40, the pipe 60, 62, or a pipe 70 positioned between the pump 74 and the canister 50 as long as the above-described pressure in the fuel vapor path can be measured.

The canister 50 is connected to the fuel tank 40 through the pipe 60 and to the intake pipe 12 through the pipe 62. The purge valve 64 serving as an exhaust device is placed in the pipe 62. The open/close valve 72 is opened so that the canister 50 can be opened to the atmosphere through the pipe 70. In the pipe 70, the open/close valve 72 and the pump 74, serving as the pressure means, are provided. The open/close valve 72 is opened so that the canister 50 is opened through the pump 74 and the pipe 70 to the atmosphere. In a pipe branching from the pipe 70, the reference orifice 76 and the orifice valve 78 are provided. The pump 74 is used to depressurize a fuel vapor path. The reference orifice 76 is for determining the size of a leakage hole formed in the fuel vapor path.

Figure 2:
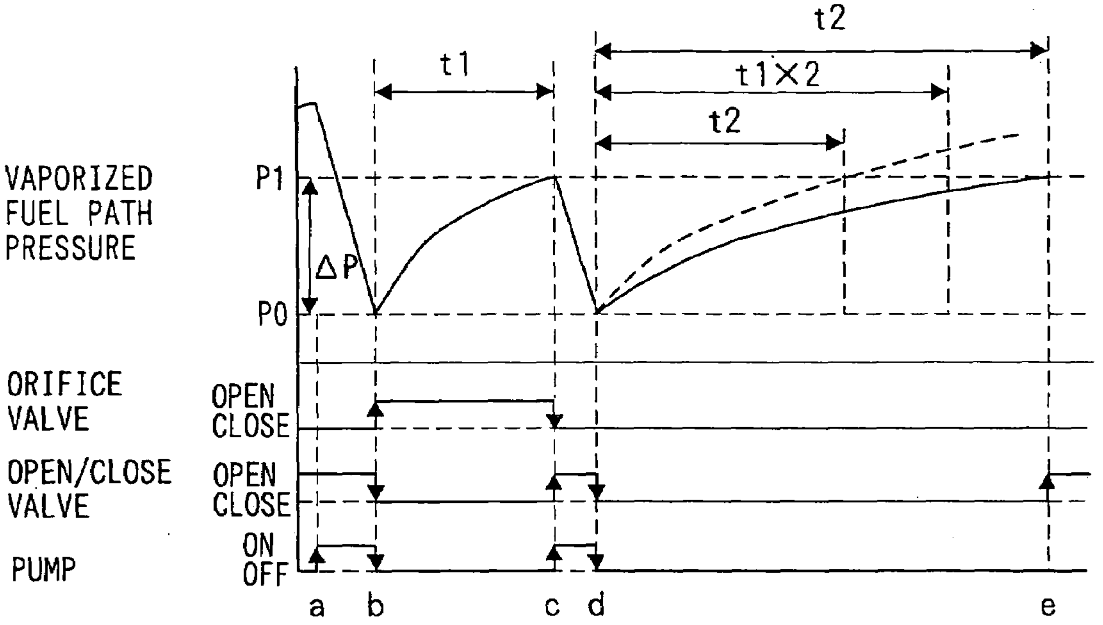
FIG. 2 is a time chart showing a leakage inspection of the fuel vapor leakage inspection apparatus according to the first embodiment.
Figure 4:
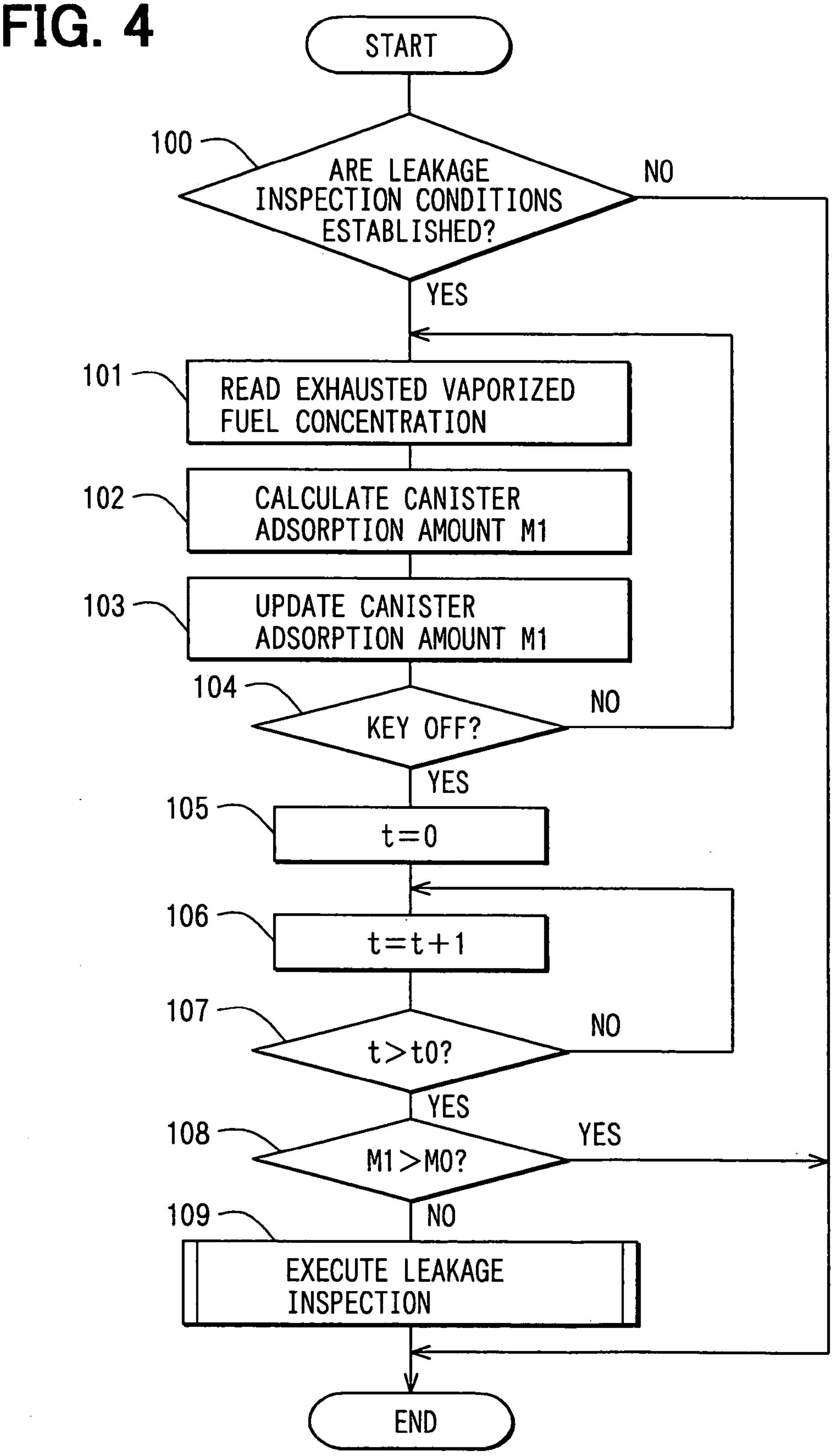
FIG. 4 is a flowchart of a fuel vapor leakage inspection process according to the first embodiment.

Next, operation of the fuel vapor leakage inspection apparatus will be described with reference to a time chart shown in FIG. 2 and a flowchart shown in FIG. 4. The flowchart shown in FIG. 4 is a main routine of a leakage inspection, which is therefore regularly executed.

At step 100, the ECU 30 determines whether or not leakage inspection conditions are established. For the leakage inspection conditions, it is determined whether or not operating conditions, temperature conditions, and the like satisfy predetermined conditions. In the case where the leakage inspection conditions are not established, the ECU 30 does not execute leakage inspection.

Figure 3:
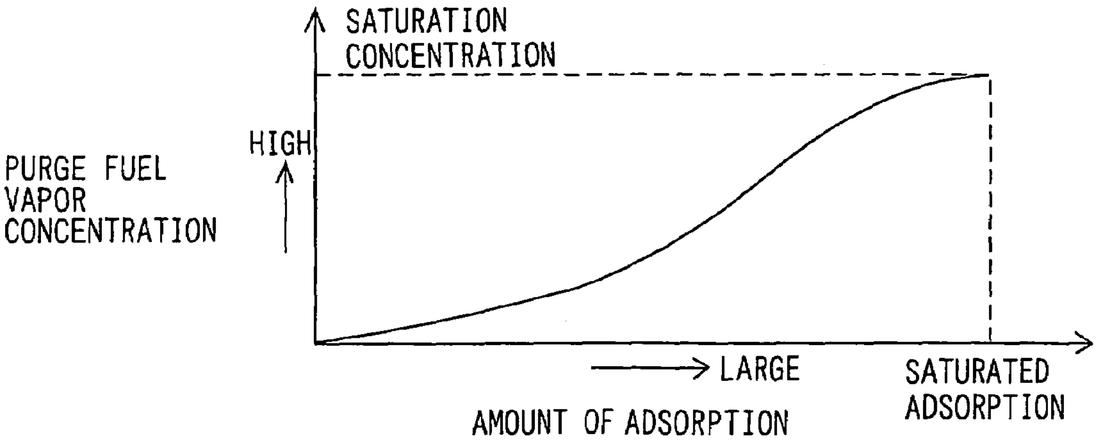
FIG. 3 is a graph showing the relationship between the amount of adsorption in a canister and the concentration of an exhausted fuel vapor.

If the leakage inspection conditions are established, a concentration of an exhausted fuel vapor, which is precalculated in the ECU 30 based on a measured signal from the air-fuel ratio sensor 22, is read at step 101. The ECU 30 calculates in advance a concentration of the fuel vapor exhausted from the canister 50 into the intake pipe 12 from the amount of a deviation between an air-fuel ratio in the exhaust gas, detected by the air-fuel ratio sensor 22, and a theoretical air-fuel ratio. Instead of the concentration of the exhausted fuel vapor, the amount of the exhausted fuel vapor may be calculated. The concentration of the exhausted fuel vapor and the amount of the adsorbed fuel vapor in the canister 50 have the relationship shown in FIG. 3. If a map of the concentration of the exhausted fuel vapor and the amount of the adsorbed fuel vapor in the canister 50 is produced based on the relationship shown in FIG. 3, the amount of adsorption M1 of the fuel vapor adsorbed in the canister 50 can be calculated from the concentration of the exhausted fuel vapor (step 102). The amount of adsorption M1 stored in memory is updated to the calculated amount of adsorption M1 of the fuel vapor at step 103.

At step 104, it is determined whether an ignition key is turned OFF or not. Steps 101, 102, and 103 are repeated until the ignition key is turned OFF. When the ignition key is turned OFF, the processing proceeds to step 105. Since the condition in the fuel tank is not stabilized immediately after the ignition key is turned OFF, a timer t is initialized at step 105 so as to be in a waiting state while repeating steps 106 and 107 until a predetermined time period is elapsed.

When the predetermined time period elapses after the ignition key is turned OFF, it is determined whether or not the amount of adsorption M1 is larger than a predetermined amount M0. If the amount of adsorption M1 is larger than the predetermined amount M0, the leakage inspection is not executed. If the amount of adsorption M1 is the predetermined amount M0 or smaller, the leakage inspection is executed at step 109. The predetermined amount M0 is a threshold value of the amount of adsorption M1, which is allowable when the fuel vapor flows out to the atmosphere during the execution of the leakage inspection.

Figure 5:
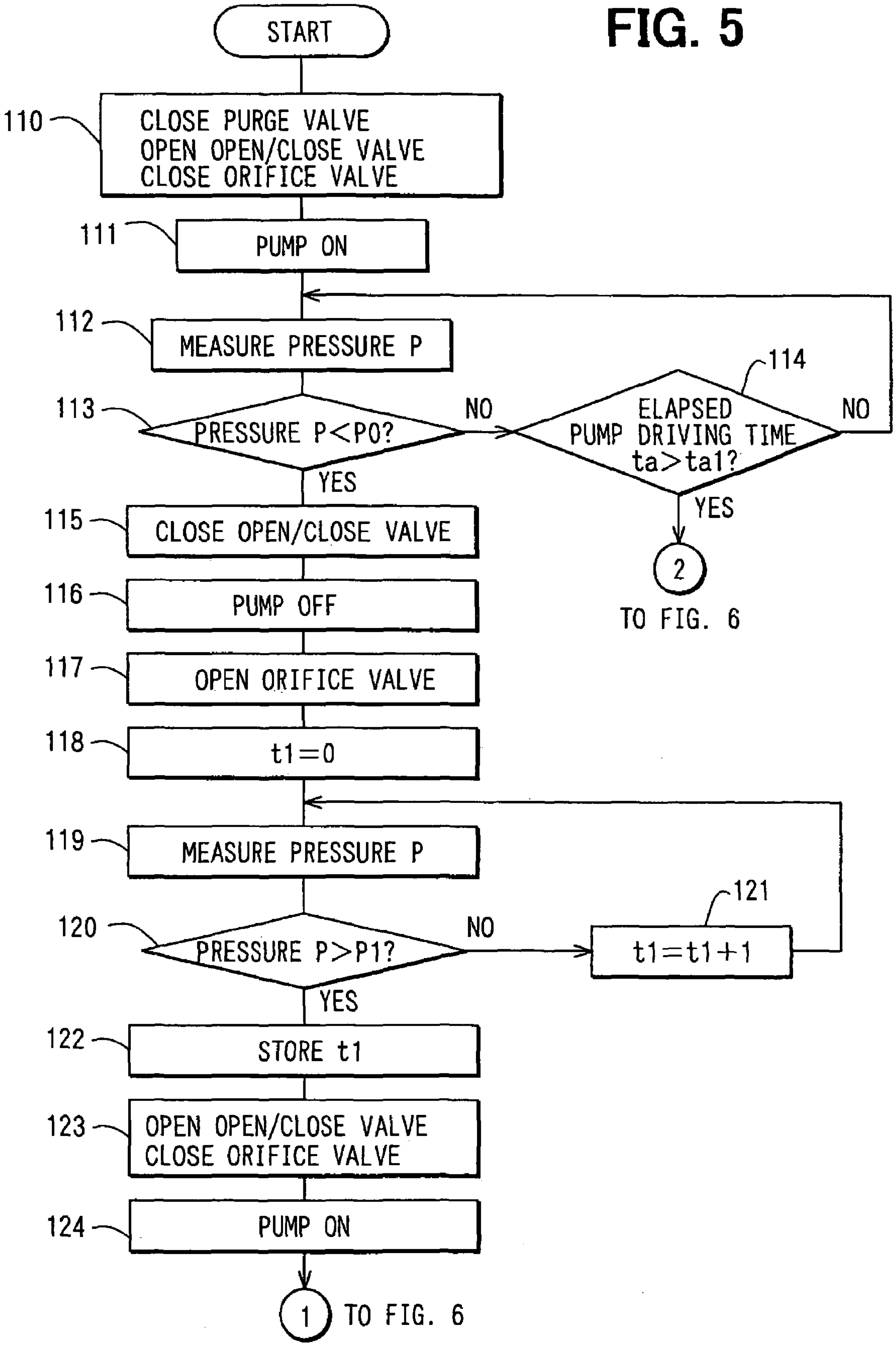
FIG. 5 is a flowchart of a fuel vapor leakage inspection process according to the first embodiment.

The details of the leakage inspection execution routine at step 109 will be described with reference to the flowcharts shown in FIGS. 5 and 6. When execution of leakage inspection is permitted, the purge valve 64 and the orifice valve 78 are closed, whereas the open/close valve 72 is opened at step 110 shown in FIG. 5. Next, at step 111, the pump 74 is turned ON so as to reduce pressure in the fuel vapor path within an interval a–b as shown in FIG. 2. The purge valve 64 and the orifice valve 78 may be closed simultaneously with the turning-ON of the pump 74. In this first embodiment, in order to prevent the pressure from being released from each of the valves due to a difference in timing of the opening or closing the valves, it is after each of the valves is opened or closed at step 110 that the pump 74 is turned ON at step 111. Even if the fuel vapor path has a leakage hole of a similar size to that of the reference orifice 76, the pump 74 is set to have the ability of reducing the pressure in the fuel vapor path to the predetermined pressure P0 or lower while the purge valve 64 and the orifice valve 78 are being closed to seal the fuel vapor path.

At step 112, the pressure P in the fuel vapor path is measured by the pressure sensor 54. Then, at step 113, it is determined whether or not the pressure P in the fuel vapor path becomes smaller than the predetermined pressure P0.

Figure 6:
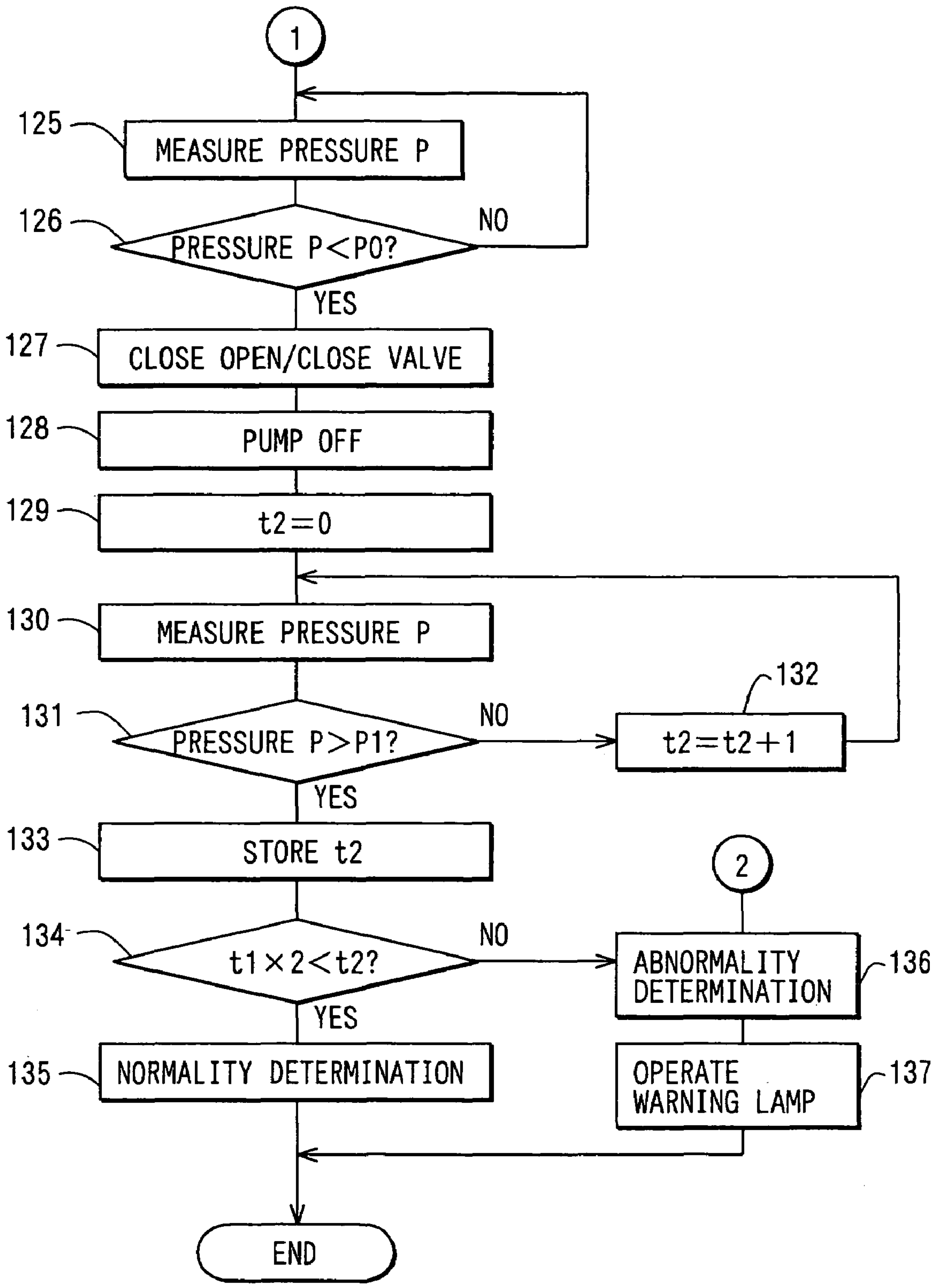
FIG. 6 is a flowchart of the fuel vapor leakage inspection process according to the first embodiment.

In the case where the pressure P does not become smaller than the predetermined pressure P0 even if a time period ta, during which the pump 74 is driven, exceeds a predetermined time period ta1 (step 114), the processing proceeds to step 136 shown in FIG. 6 where it is determined that the abnormality occurs. Subsequently, at step 137, a warning lamp serving as a warning means is lit so as to inform an operator of the occurrence of an abnormality. In this manner, the leakage inspection is terminated. Alternatively, warning sounds may be produced as the warning means. The predetermined time period ta1 is long enough to make the pressure P smaller than the predetermined pressure even if the leakage hole having a similar size to that of the reference orifice 76 is formed in the leakage inspection apparatus.

When the pressure P is dropped to the predetermined pressure P0 or lower within the predetermined time period ta1, the open/close valve 72 is closed at step 115. Then, after the pump 74 is turned OFF at step 116, the orifice valve 78 is opened at step 117. The operations of the open/close valve 72, the pump 74, and the orifice valve 78 may be simultaneously performed. In this first embodiment, however, the open/close valve 72 is closed first so as to prevent the negative pressure in the fuel vapor path from being released from the open/close valve 72 due to a difference in timing of operations.

The purge valve 64 and the open/close valve 72 are closed. Therefore, when the orifice valve 78 is opened, the atmospheric gases flow from the orifice valve 78 through the reference orifice 76 into the fuel vapor path. Thus, as shown in FIG. 2, the pressure in the fuel vapor path gradually increases within an interval b–c. In the case where leakage occurs from the fuel vapor path, the atmosphere flows into the fuel vapor path from both the portion where the leakage occurs and the reference orifice 76.

After the orifice valve 78 is opened, the timer t1 is initialized at step 118, followed by step 119 where the pressure P in the fuel vapor path is measured. At steps 120 and 121, the amount of time required to make the pressure P higher than the predetermined pressure P1 is measured. When the pressure P becomes higher than the predetermined pressure P1, a required time period, that is, a value indicated by the timer t1, is stored in the memory at step 122.

At step 123, the orifice valve 78 is closed again, whereas the open/close valve 72 is opened. Next, the pump 74 is turned ON at step 124 so as to reduce the pressure in the fuel vapor path in an interval c–d shown in FIG. 2. The processing is in a waiting state until the pressure P becomes lower than the predetermined pressure P0 at steps 125 and 126.

When the pressure P becomes lower than the predetermined pressure P0, the open/close valve 72 is closed at step 127. Then, the pump 74 is turned OFF at step 128. Since the orifice valve 78 remains closed, the atmosphere flows into the fuel vapor path from the leakage hole formed in the fuel vapor path. After the pump 74 is turned OFF, a timer t2 is initialized at step 129. At steps 130, 131 and 132, the timer t2 is counted up until the pressure P becomes higher than the predetermined pressure P1 in an interval d–e in FIG. 2.

When the pressure P becomes higher than the predetermined pressure P1, a value indicated by the timer t2 at this time is stored in the memory at step 133. In the case where the atmosphere flows into the sealed fuel vapor path from the leakage hole, the velocity of the atmosphere flowing from the leakage hole is the same as long as the pressure is constant according to Bernoulli's theorem (see the following Formula 1).

$$(v^2/2)+(P/\rho)+gz=\text{Constant} \quad \text{[Formula 1]}$$

where v: flow velocity, ρ: density, P: pressure, g: gravitational constant, z: position Thus, the flow volume of leakage is proportional to a leakage cross-sectional area A (volume of flow Q=flow velocity v×leakage cross-sectional area A) as long as the pressure P is constant. When the cross-sectional area of the leakage hole is doubled, the amount of leakage is also doubled. Accordingly, when the cross-sectional area of the leakage hole is doubled, a pressure increase rate in the sealed space is also doubled. Specifically, in the case where the leakage occurs in the sealed space whose pressure is reduced to the same pressure, the amount of time required to increase the pressure to the same pressure P is halved with the double cross-sectional area of the leakage hole.

With the application of this principal to the first embodiment, in the case where a leakage hole having the same cross-sectional area as that of the reference orifice 76 is present in the leakage inspection apparatus, the cross-sectional area of the leakage hole is halved at the second pressure increase as compared with that at the first pressure increase because the orifice valve 78 remains closed for the second pressure increase. Therefore, the amount of time required to increase the pressure to the predetermined pressure P1, that is, the value indicated by the timer t2, is twice the value indicated by the timer t1 (t2=t1×2). In the case where a leakage hole having a cross-sectional area larger than that of the reference orifice 76 is present in the leakage inspection apparatus, a ratio of the cross-sectional area of the leakage hole at the first pressure increase to that at the second pressure increase becomes larger than ½. Thus, the value indicated by the timer t2, that is, the amount of time required to increase the pressure to the predetermined pressure P1, is smaller than twice the value indicated by the timer t1 (t2<t1×2), as indicated with a dotted line between d and e in FIG. 2.

As described above, at step 134, a value indicated by t2 and a value of t1×2 are compared with each other. In the case where the value of the timer t2 is not larger than t1×2, it is determined that the rate of pressure increase is high, that is, the cross-sectional area of the leakage hole is larger than that of the reference orifice 76. Therefore, it is determined at step 136 that the abnormality occurs, followed by step 137 where the warning lamp is lit. In the case where the value indicated by the timer t2 is larger than t1×2, after it is determined that the state is normal, the leakage inspection is terminated.

In the first embodiment, since the depressurization of the fuel vapor path having the same volume is performed twice, that is, at the first depressurization (in the interval a–b in FIG. 2) and at the second depressurization (in the interval c–d in FIG. 2), it is unnecessary to correct the measured value in accordance with a difference in the amount of the fuel remaining in the fuel tank 40. Moreover, since the temperature condition remains the same, it is also unnecessary to correct the measured value in accordance with the temperature.

Since the pump 74 is stopped after the pressure is reduced to the predetermined pressure P0 in the first embodiment, the amount of time required to reduce the pressure is shortened if the pump 74 still has the ability of reducing the pressure. Therefore, the lifetime of the pump 74 is prolonged to allow the reduction of power consumption. In the case where the leakage inspection is executed while the engine is stopped, the reduction in power consumption is effective.

Figure 7:
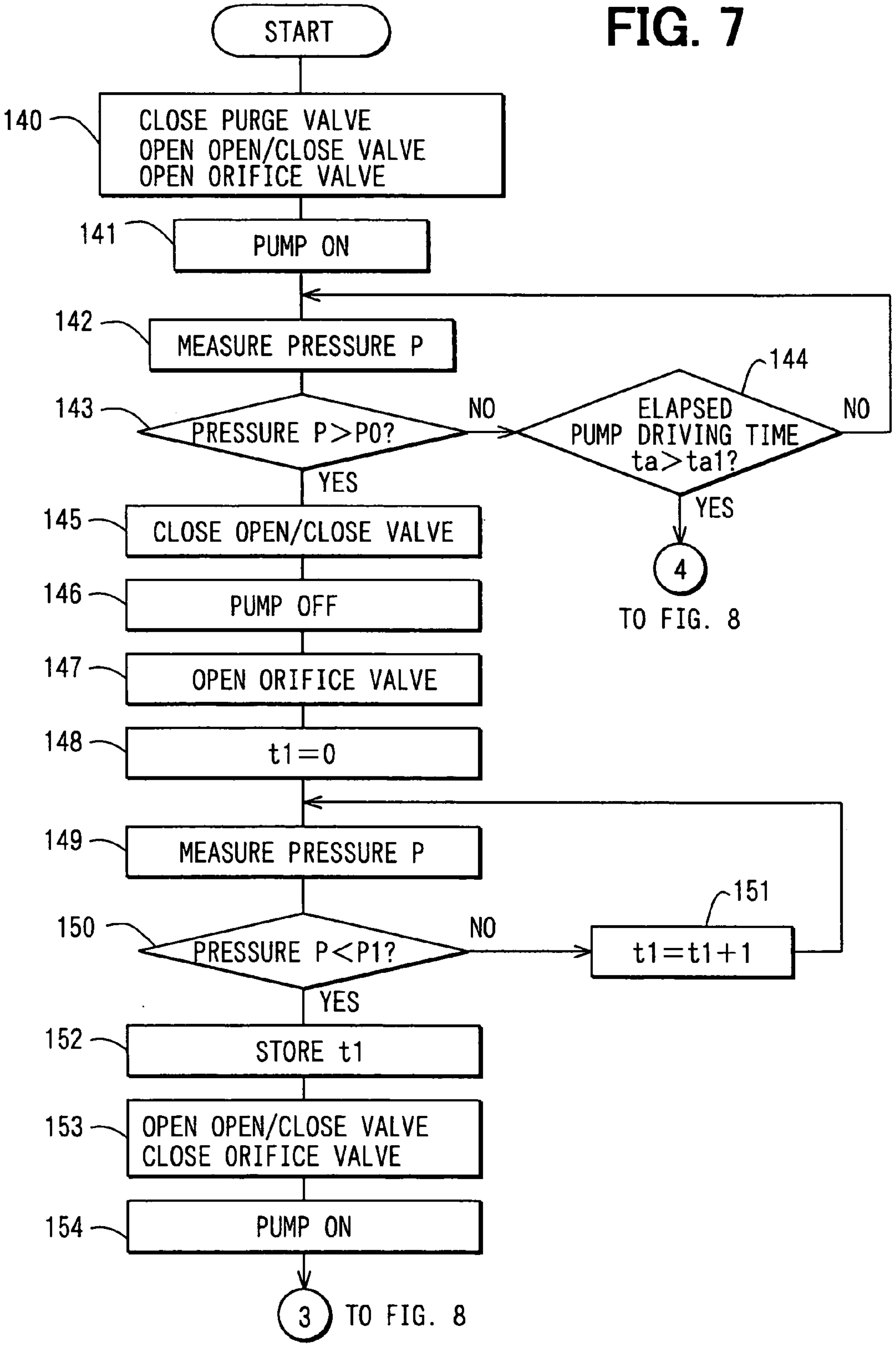
FIG. 7 is a flowchart of a fuel vapor leakage inspection process according to a variation of the first embodiment.
Figure 8:
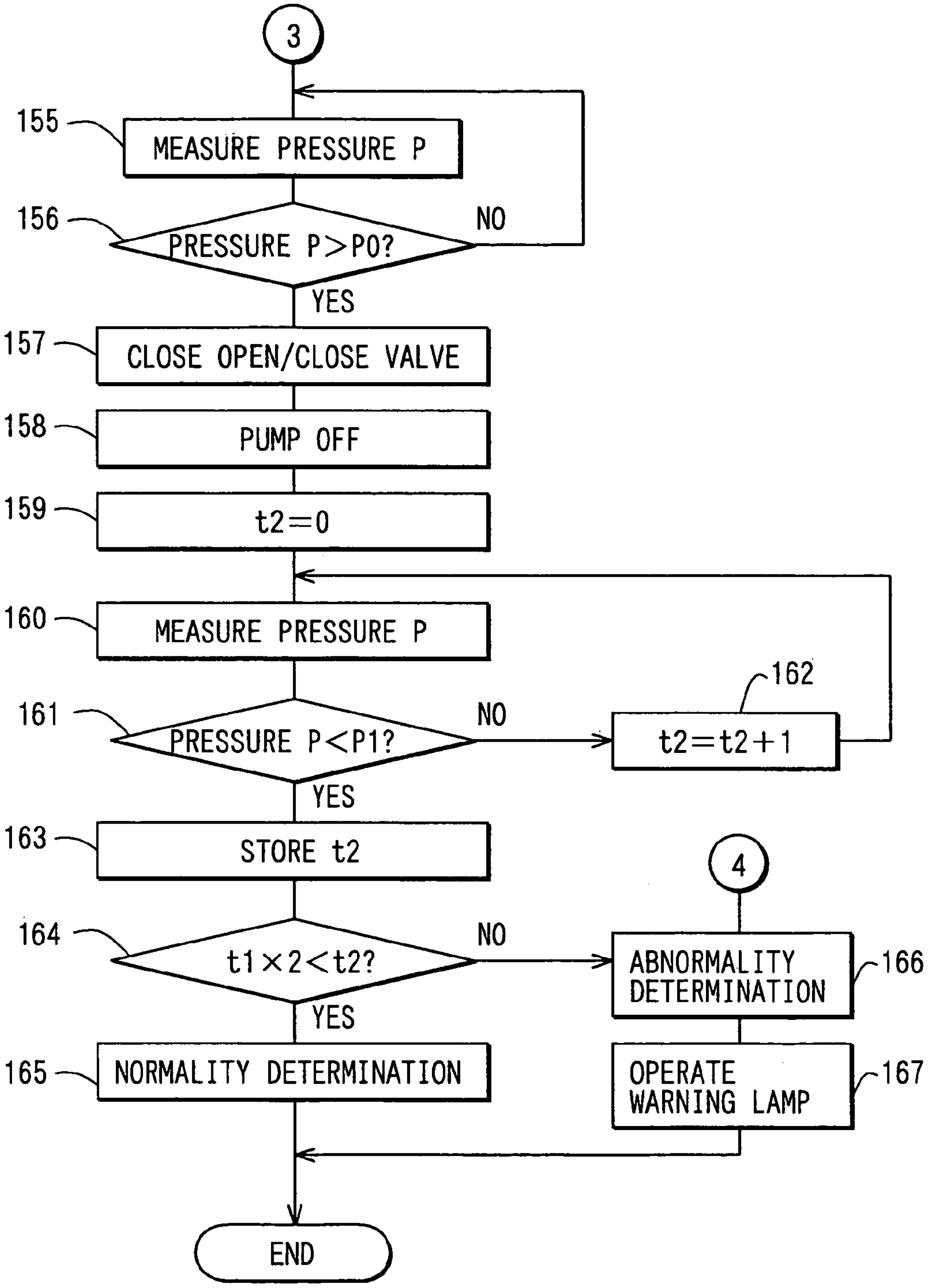
FIG. 8 is a flowchart of the fuel vapor leakage inspection process according to the variation of the first embodiment.

Although the leakage inspection is executed by depressurizing the fuel vapor path with the pump 74 in the above-described embodiment, the leakage inspection may also be executed by pressurizing the fuel vapor path. FIGS. 7 and 8 are flowcharts in such a case. The processing is the same as that described above except that the magnitude relations between the pressure P in the fuel vapor path and the predetermined pressure P0 or P1 at steps 143, 150, 156, and 161 are opposite to those at steps 113, 120, 126, and 131 in the flowcharts shown in FIGS. 5 and 6.

In the first embodiment, it is determined if the amount of adsorption M1 of the canister 50 is larger than the predetermined amount M0 prior to the execution of the leakage inspection execution routine (step 109) in the main routine. If the amount of adsorption M1 is larger than the predetermined amount M0, the leakage inspection execution routine is not executed. Therefore, the fuel vapor is prevented from flowing out into the atmosphere during execution of the leakage inspection.

The same effects can be obtained even if any leakage inspection method (for example, a leakage inspection method employing a leakage inspection execution routine shown in FIGS. 25 and 26 in a configuration shown in FIG. 21 as described below in an eleventh embodiment) is used as the leakage inspection execution routine at step 109 in FIG. 4 as long as the main routine shown in FIG. 4 is employed.

(Second Embodiment)

Figure 9:
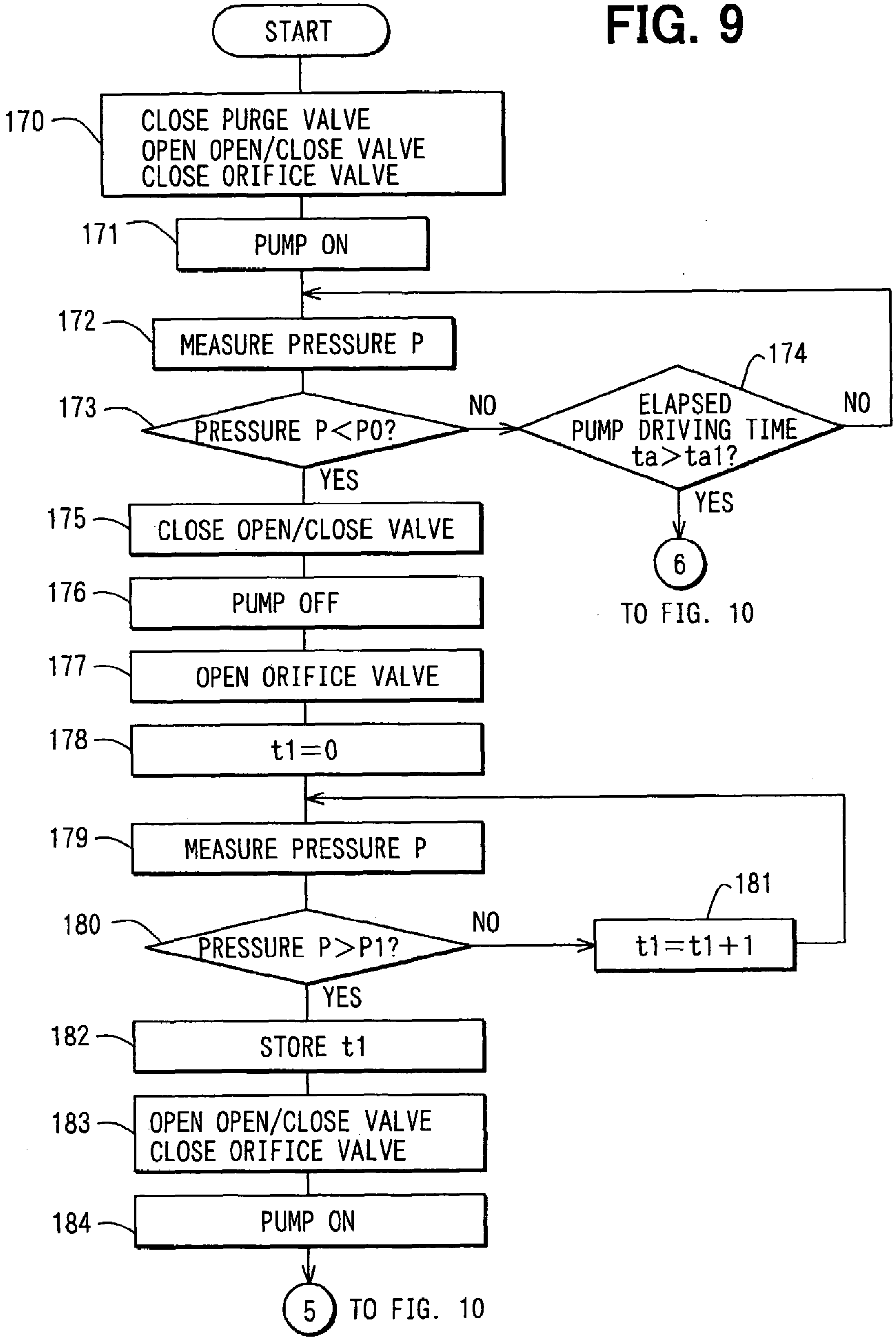
FIG. 9 is a flowchart of a fuel vapor leakage inspection process according to a second embodiment of the present invention.
Figure 10:
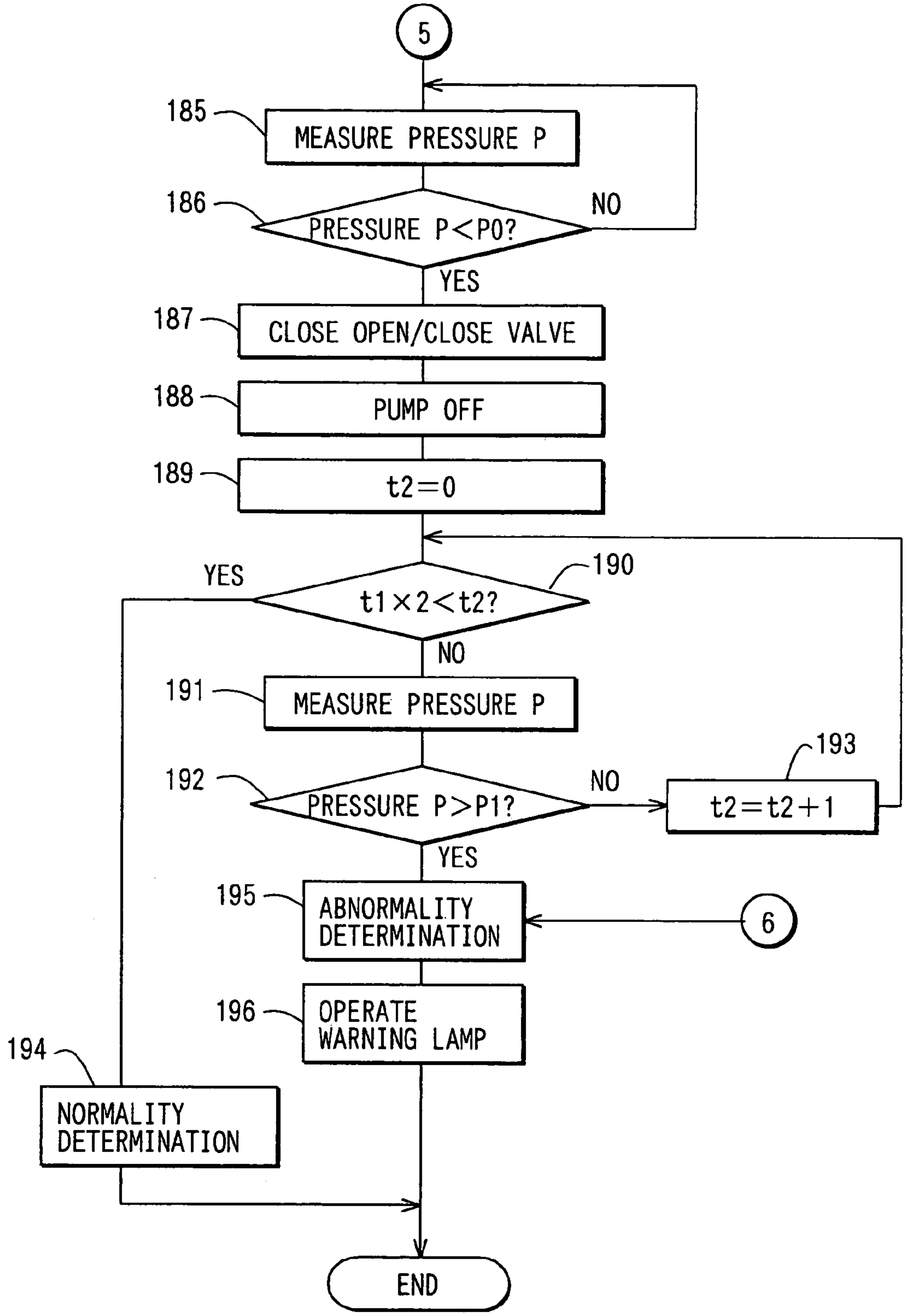
FIG. 10 is a flowchart of the fuel vapor leakage inspection process according to the second embodiment of the present invention.

FIGS. 9 and 10 show flowcharts of a liquid inspection execution routine according to a second embodiment of the present invention. The configuration of a fuel vapor leakage inspection apparatus is substantially the same as that in the first embodiment. The main routine of the leakage inspection is the same as that in the first embodiment shown in FIG. 4. Moreover, in the leakage inspection execution routine, steps 170 to 184 shown in FIG. 9 and steps 185 to 189 shown in FIG. 10 are the same as steps 110 to 124 shown in FIG. 5 and steps 125 to 129 shown in FIG. 6, respectively.

In the first embodiment, the processing is in a waiting state while counting up the timer t2 until the pressure P in the fuel vapor path becomes the predetermined pressure P1 after depressurization. However, in the case where leakage scarcely occurs from the fuel vapor path, a pressure increase after the second depressurization (represented by an interval d–e shown in FIG. 2) becomes extremely gradual. Therefore, it takes a long time for the pressure to reach the predetermined pressure P1.

In the second embodiment, in order to overcome this disadvantage, at step 190 after depressurization, it is first determined which of t1×2 and t2 is larger. Then, at step 192, the pressure P and the predetermined pressure P1 are compared with each other. Therefore, when t2 becomes larger than t1×2 before the pressure P becomes higher than the predetermined pressure P1, it is determined that the state is normal at step 194 to terminate the leakage inspection.

When the pressure P becomes larger than the predetermined pressure P1 before t2 becomes larger than t1×2, it is determined that the cross-sectional area of the leakage hole is larger than that of the reference orifice 76. It is determined at step 195 that the abnormality occurs, followed by step 196 where the warning lamp is lit.

Since the elapsed time periods are compared before the comparison between the pressures, the amount of time required for the inspection becomes shorter than in the first embodiment, in the case where the cross-sectional area of the leakage hole is small.

Since the main routine of the leakage inspection in the second embodiment is the same as that in the first embodiment, the leakage inspection execution routine is not executed if the amount of adsorption M1 in the canister 50 is larger than the predetermined amount M0. Thus, the fuel vapor is prevented from flowing out into the atmosphere during execution of the leakage inspection.

(Third Embodiment)

Figure 11:
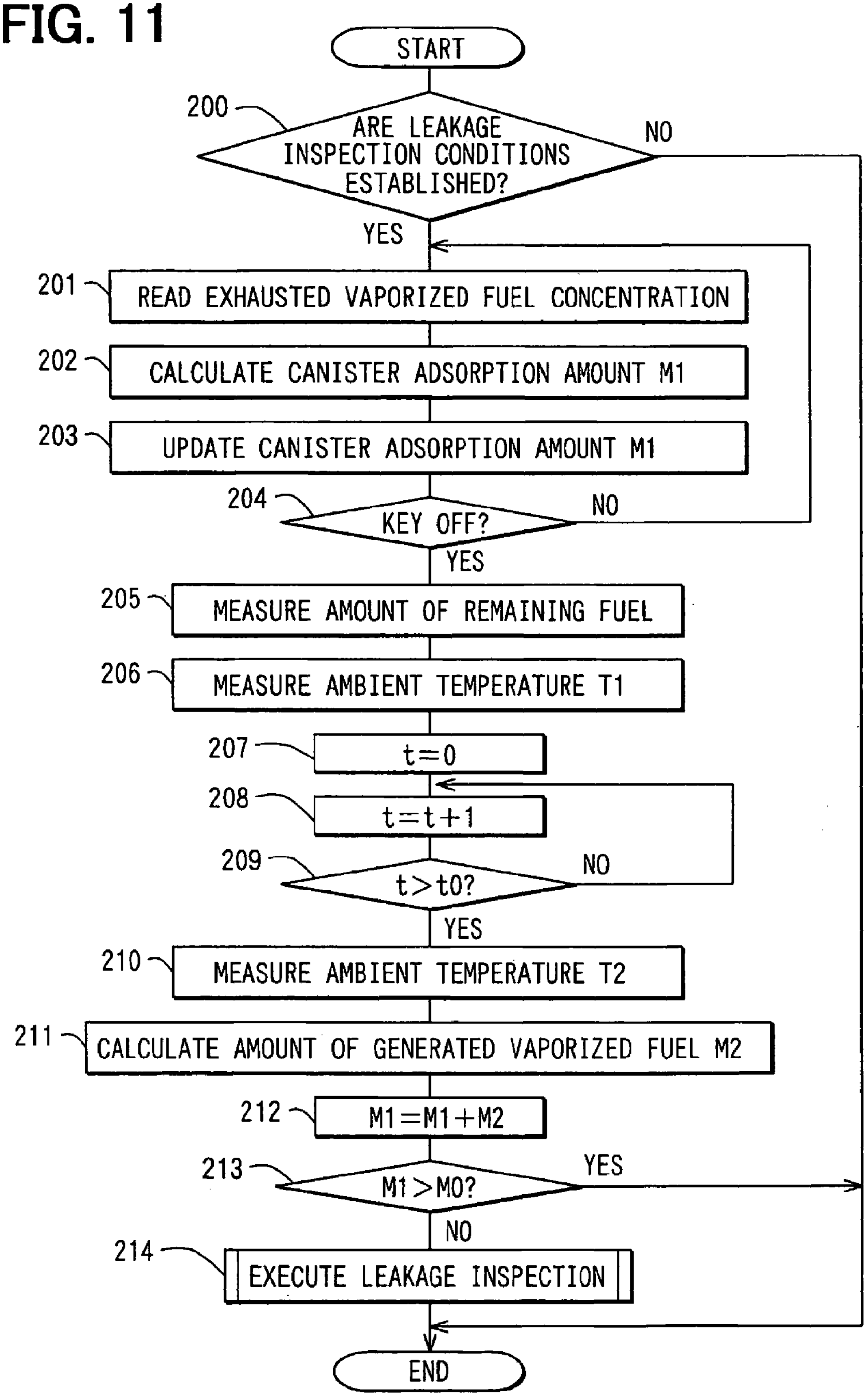
FIG. 11 is a flowchart of a fuel vapor leakage inspection process according to a third embodiment of the present invention.

FIG. 11 shows a flowchart of a main routine of a leakage inspection according to a third embodiment of the present invention. The configuration of a fuel vapor leakage inspection apparatus is substantially the same as that in the first embodiment.

For example, in the case where the temperature is high or the temperature fluctuates greatly, if the leakage inspection is executed while a vehicle is stopping, the amount of the fuel vapor adsorbed in the canister 50 increases within a time period from the vehicle stop to the execution of the leakage inspection. Therefore, the amount of adsorption in the canister 50, which is calculated based on the amount of the exhausted fuel vapor when the fuel vapor adsorbed by the adsorbent 52 is exhausted into the intake pipe 12 while the car is running, may differ from that in the canister 50 when the leakage inspection is executed.

In view of this problem, in the third embodiment, the amount of the fuel vapor, which is adsorbed in the canister 50 in a time period from the vehicle stop to the execution of the leakage inspection, is calculated. In accordance with the calculated amount of the fuel vapor, it is determined whether or not to execute the leakage inspection execution routine (step 214).

First, at steps 200 to 204, in the case where the leakage inspection conditions are established, the amount of the fuel vapor M1 adsorbed in the canister 50 is updated. After the ignition key is turned OFF, the amount of remaining fuel is measured by a sensor such as a level gauge of the fuel tank 40 at step 205. Next, at step 206, an ambient temperature T1 measured immediately after the vehicle stops is measured by a temperature sensor such as an intake-air temperature sensor or a vehicle compartment temperature sensor.

Since the state in the fuel tank 40 immediately after the turning-OFF of the ignition key is not stabilized, the fuel vapor processing system is in a waiting state at steps 207, 208, and 209 until a predetermined time period elapses after the ignition key is turned OFF.

After elapse of the predetermined time period, an ambient temperature T2 is measured again at step 210. Then, at step 211, the amount of the fuel vapor M2, which is generated in the fuel tank 40 while the vehicle is stopping is calculated based on the amount of remaining fuel and a change in temperature after the vehicle stops (T2−T1). At step 212, the amount of adsorption M1 updated at step 203 is added to the amount of the fuel vapor M2 generated after the vehicle stops so as to update the amount of adsorption M1 again. If it is determined that the updated amount of adsorption M1 is equal to or smaller than the predetermined amount M0 at step 213, the leakage inspection execution routine (step 214) is executed. On the other hand, if it is determined that the updated amount of adsorption M1 is larger than the predetermined amount M0 at step 213, the leakage inspection execution routine (step 214) is not executed. Thus, the fuel vapor is prevented from flowing out into the atmosphere during the execution of the leakage inspection. The leakage inspection execution routine is the same as that in the first embodiment or that in the second embodiment.

The same effects can be obtained even if any leakage inspection method is used for the leakage inspection execution routine (step 214) as long as the main routine shown in FIG. 11 is employed.

(Fourth Embodiment)

Figure 12:
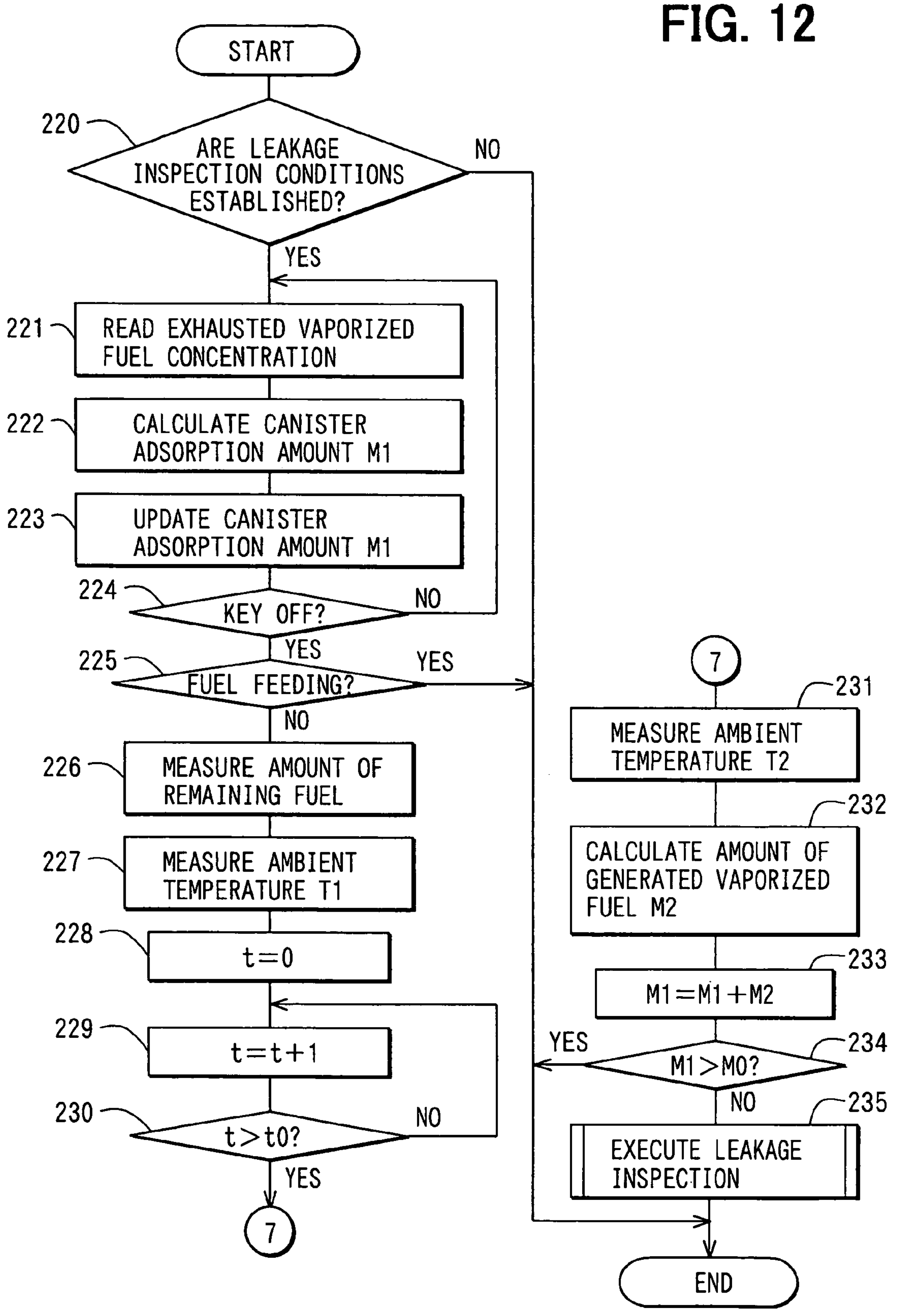
FIG. 12 is a flowchart of a fuel vapor leakage inspection process according to a fourth embodiment of the present invention.

FIG. 12 shows a flowchart of a main routine of a leakage inspection according to a fourth embodiment of the present invention. The configuration of a fuel vapor leakage inspection apparatus is substantially the same as that in the first embodiment. In addition to the case where the temperature is high or the temperature fluctuates greatly, the amount of the fuel vapor generated in the fuel tank 40 increases if fuel is fed to the fuel tank 40. Correspondingly, the amount of the fuel vapor adsorbed in the canister 50 increases. Therefore, the amount of adsorption in the canister 50, calculated based on the amount of the exhausted fuel vapor when purging is executed while the vehicle is running may sometimes differ from that in the canister 50 when the leakage inspection is executed during fuel feeding.

In view of this problem, in the fourth embodiment, it is determined whether or not the fuel is fed after the vehicle stops. Steps 220 to 224 and 226 to 235 shown in FIG. 12 are the same as steps 200 to 214 shown in FIG. 11 in the third embodiment. In the fourth embodiment, after it is determined that the ignition key is turned OFF at step 224 in the main routine, it is determined whether or not the fuel is fed at step 225. The determination whether or not the fuel is fed is made by detecting, for example, if a fuel cap is opened, with a sensor serving as a fuel-feeding detection means. If the fuel is fed, the leakage inspection execution routine (step 235) is not executed. If the fuel is not fed, the same processing as that in the third embodiment is performed after step 225.

The same effects can be obtained even if any leakage inspection method is used for the leakage inspection execution routine (step 235) as long as the main routine shown in FIG. 12 is employed.

(Fifth Embodiment)

Figure 13:
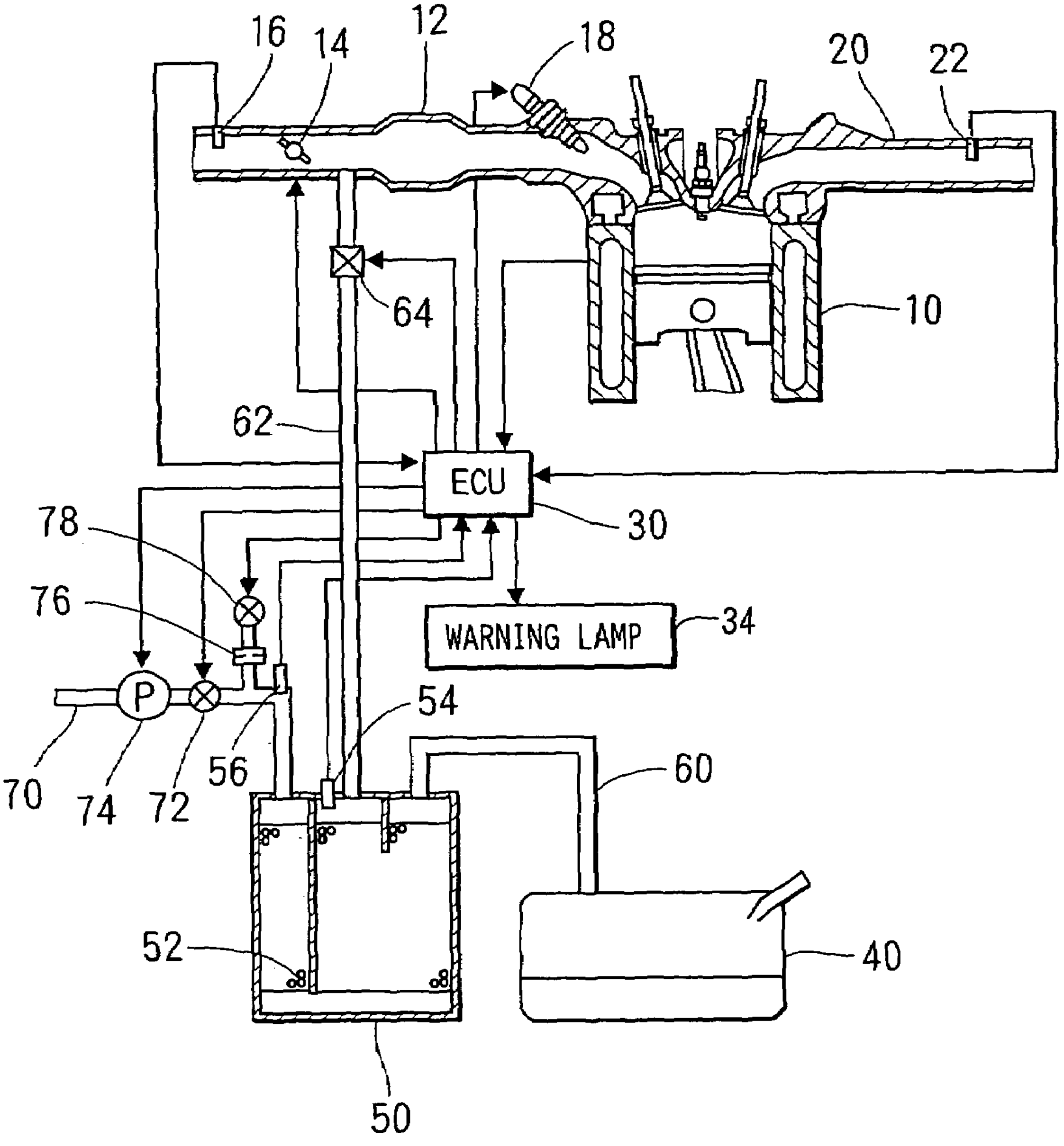
FIG. 13 is a configuration view of a fuel vapor leakage inspection apparatus according to a fifth embodiment of the present invention.

FIG. 13 shows a fuel vapor leakage inspection apparatus according to a fifth embodiment of the present invention. The components in the fifth embodiment, which are substantially the same as those in the first embodiment, are denoted by the same reference numerals. A concentration sensor 56 serving as a concentration measurement means for measuring a concentration of the fuel vapor is provided for the canister 50 on its atmosphere side. The concentration sensor 56 may be provided at any position as long as it is situated for the canister 50 on its atmosphere side.

Figure 14:
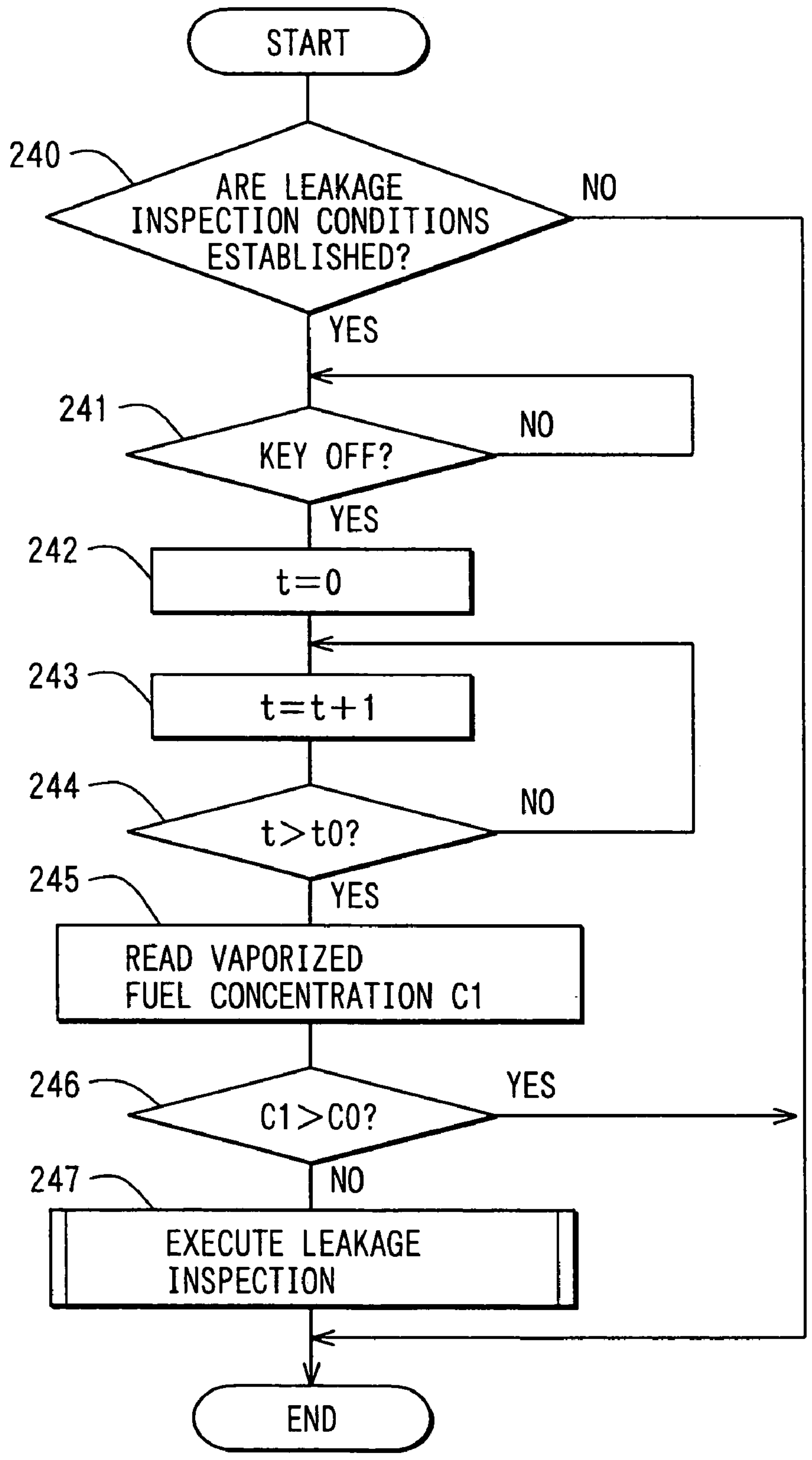
FIG. 14 is a flowchart of a fuel vapor leakage inspection process according to the fifth embodiment.

FIG. 14 shows a flowchart of a main routine of a leakage inspection. Since steps 240 to 244 are the same as steps 100 and 104 to 107 in the first embodiment, their descriptions are omitted here. A fuel vapor concentration C1 on the atmosphere side of the canister 50 is measured by the concentration sensor 56 immediately before the execution of the leakage inspection (step 245). At step 246, it is determined if the fuel vapor concentration C1 is larger than a predetermined value C0. If the fuel vapor concentration C1 is larger than the predetermined value C0, leakage inspection is not executed. If the fuel vapor concentration C1 is equal to or smaller than the predetermined value C0, the leakage inspection is executed at step 247. The predetermined value C0 is a threshold value of the fuel vapor concentration C1 that is allowed when the fuel vapor flows out to the atmosphere during the execution of the leakage inspection. The leakage inspection execution routine is the same as that in the first embodiment or that in the second embodiment.

In the above-described first to fifth embodiments, it is determined whether or not the leakage inspection execution routine is to be executed by determining the amount of adsorption in the canister 50, the fuel vapor concentration, or if the fuel is fed after the vehicle stops, in the main routine. Therefore, the fuel vapor can be prevented from flowing out into the atmosphere during the execution of the leakage inspection.

Moreover, the main routine shown in FIG. 4, 11, 12, or 14 is regularly executed. Therefore, in the case where the leakage inspection is stopped because of a large amount of adsorption in the canister 50, when the fuel vapor adsorbed in the canister 50 is exhausted into the intake pipe 12 so that the amount of adsorption M1 becomes equal to or smaller than the predetermined amount M0, the leakage inspection is started again. Furthermore, the running conditions of the vehicle, which allow the amount of adsorption M1 to be equal to or smaller than the predetermined amount M0, may be preset. When the running conditions are satisfied, the leakage inspection may be executed.

(Sixth Embodiment)

Figure 15:
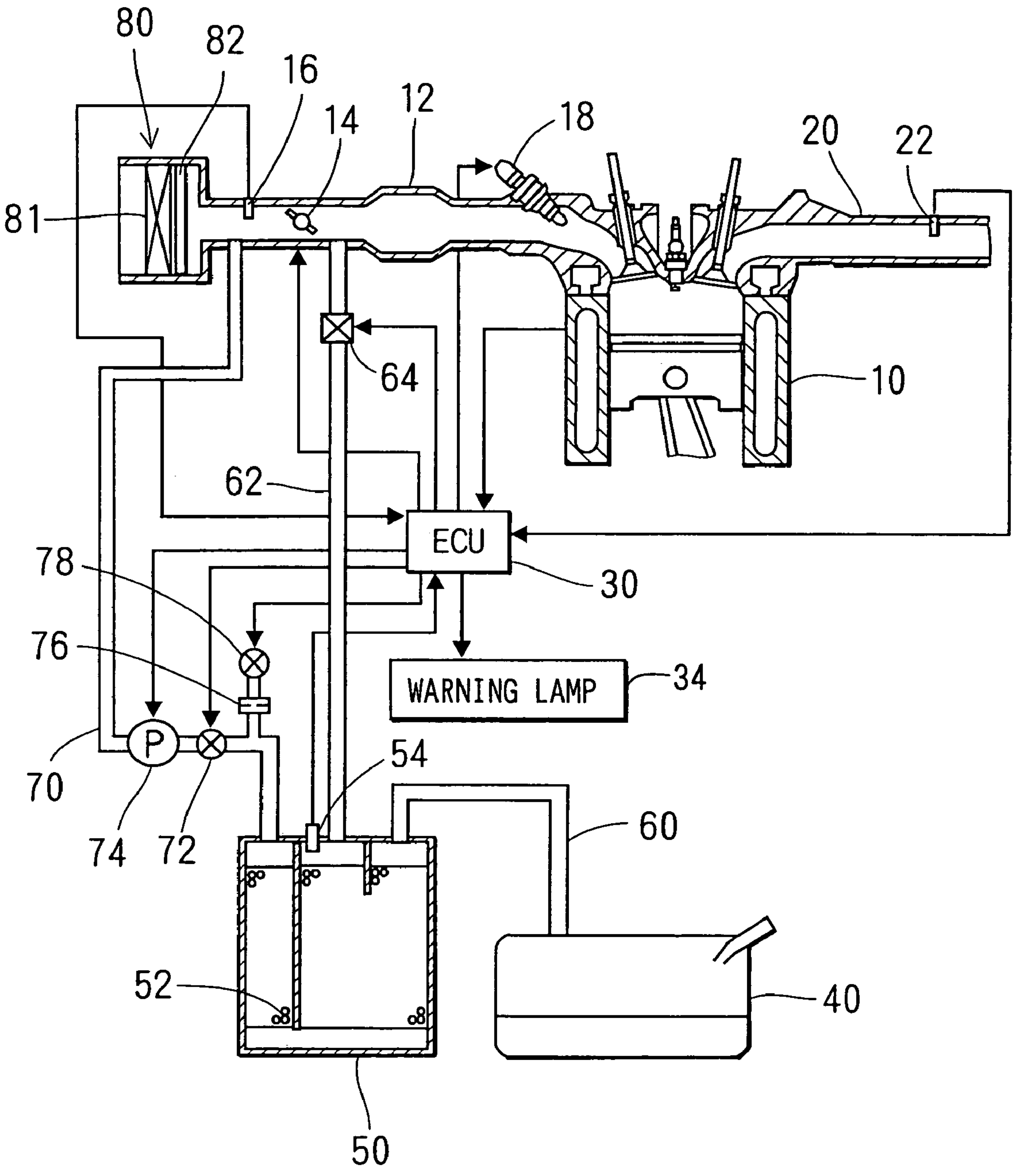
FIG. 15 is a configuration view of a fuel vapor leakage inspection apparatus according to a sixth embodiment of the present invention.

FIG. 15 shows a fuel vapor leakage inspection apparatus according to a sixth embodiment of the present invention. The components of the fuel vapor leakage inspection apparatus, which are substantially the same as those of the first embodiment, are denoted by the same reference numerals.

The pipe 70 serving as a connection pipe, which is connected to the pump 74, is connected to the suction pipe 12 between the throttle device 14 and an air cleaner 80 upstream of the throttle device 14. The pipe 70 may be connected to the intake pipe 12 at any position as long as it is positioned between an adsorbent 82 and the combustion chamber of the engine 10.

Figure 16:
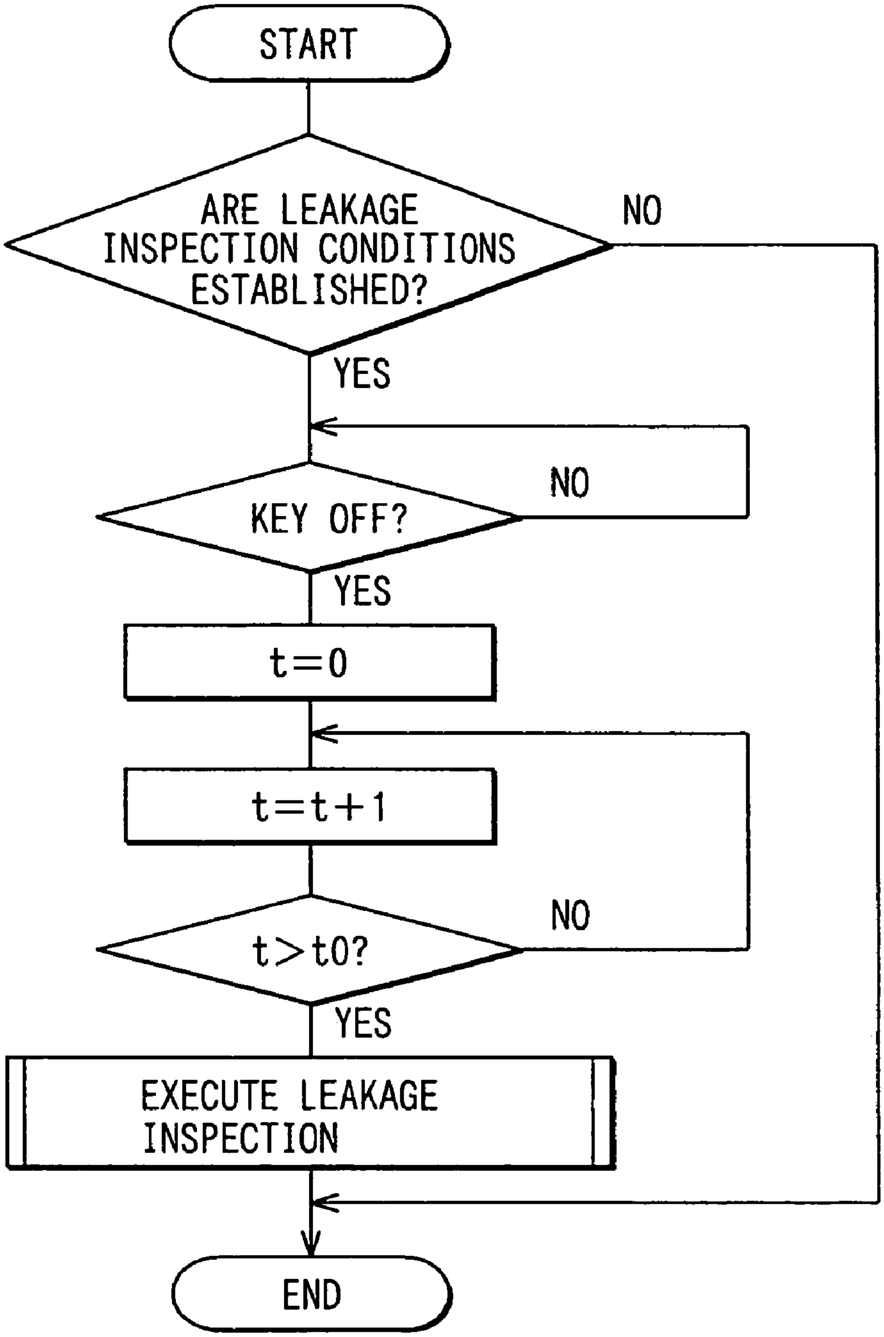
FIG. 16 is a flowchart of a fuel vapor leakage inspection process according to the sixth embodiment.

The air cleaner 80 houses a filter 81 and a second adsorbent or the adsorbent 82 serving as an intake adsorbent downstream of the filter 81 in its case. In the canister 50, the adsorbent 52, which serves as a first adsorbent, is housed. If the fuel vapor is contained in the air exhausted from the pump 74 when the fuel vapor path is depressurized, the fuel vapor passes through the pipe 70 and the intake pipe 12 so as to be adsorbed by the adsorbent 82. The air, from which the fuel vapor is removed through the adsorbent 82, passes through the filter 81 so as to flow out into the atmosphere. Even if the fuel vapor is exhausted from the pump 74 during the execution of the leakage inspection, the fuel vapor is prevented from flowing out into the atmosphere. The leakage inspection can be executed regardless of the amount of the adsorbed fuel vapor in the canister 50. Therefore, in contrast with the main routine shown in FIG. 4 in the first embodiment, the amount of the adsorbed fuel vapor in the canister 50 is not calculated in the main routine shown in FIG. 16 in the sixth embodiment.

Figure 30:
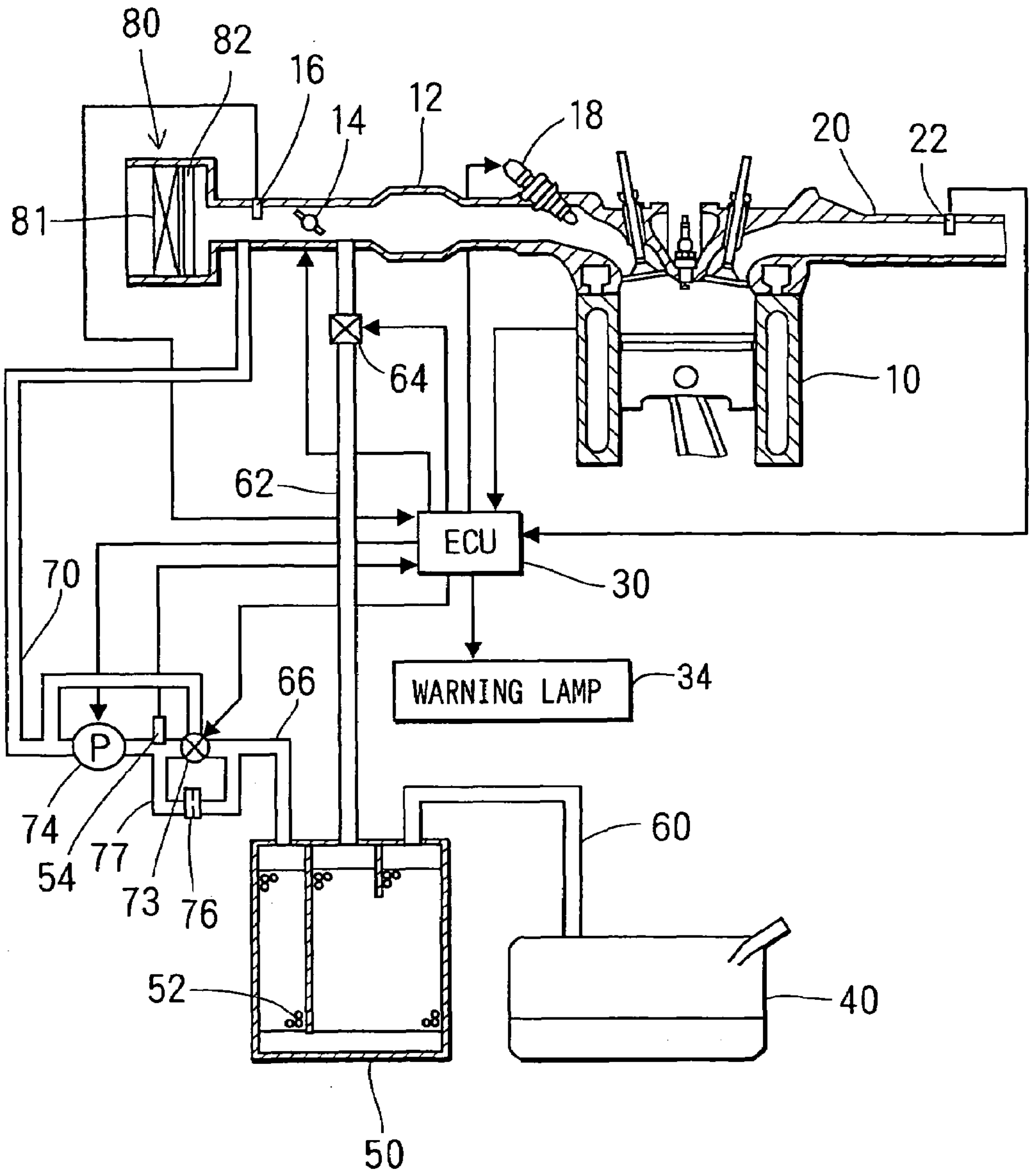
FIG. 30 is a view showing the configuration of a fuel vapor leakage inspection apparatus according to a thirteenth embodiment of the present invention.

The same effects can be obtained even if the configuration of the evaporation system is altered. For example, as shown in FIG. 30 described below, as long as the atmosphere side of the pump 74 and the intake pipe 12 are connected with each other through the pipe 70 and the adsorbent 82 is provided in the vicinity of a suction port of the intake pipe 12, the same effects can be obtained.

(Seventh Embodiment)

Figure 17:
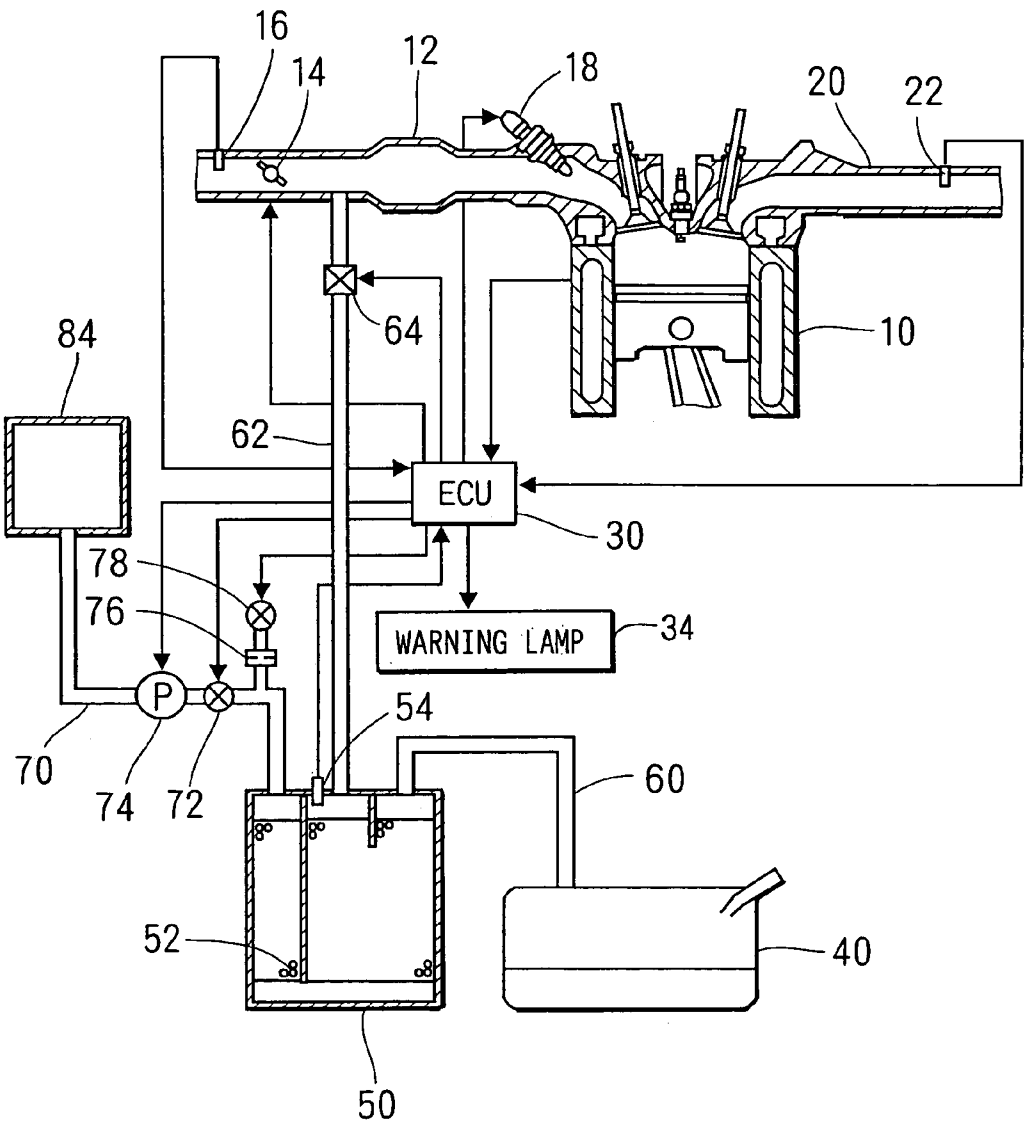
FIG. 17 is a configuration view of a fuel vapor leakage inspection apparatus according to a seventh embodiment of the present invention.

FIG. 17 shows a fuel vapor leakage inspection apparatus according to the seventh embodiment of the present invention. The components of the fuel vapor leakage inspection apparatus according to the seventh embodiment, which are substantially the same as those of the first embodiment, are denoted by the same reference numerals.

A sealed container 84 is connected to an end of the pipe 70 connected to the pump 74. The air exhausted from the pump 74 is stored in the sealed container 84 by a discharge pressure of the pump 74. Therefore, even if the fuel vapor is exhausted from the pump 74 during the execution of the leakage inspection, the fuel vapor is prevented from flowing out into the atmosphere. Since the leakage inspection can be executed regardless of the amount of the adsorbed fuel vapor in the canister 50, the amount of the adsorbed fuel vapor in the canister 50 is not calculated in the main routine of the leakage inspection in the seventh embodiment as in the sixth embodiment. The same effects can be obtained even if the configuration of the evaporation system is altered, for example, as in FIG. 31 described below as long as the sealed container 84 is connected to the atmosphere side of the pump 74 through the pipe 70.

(Eighth Embodiment)

Figure 18:
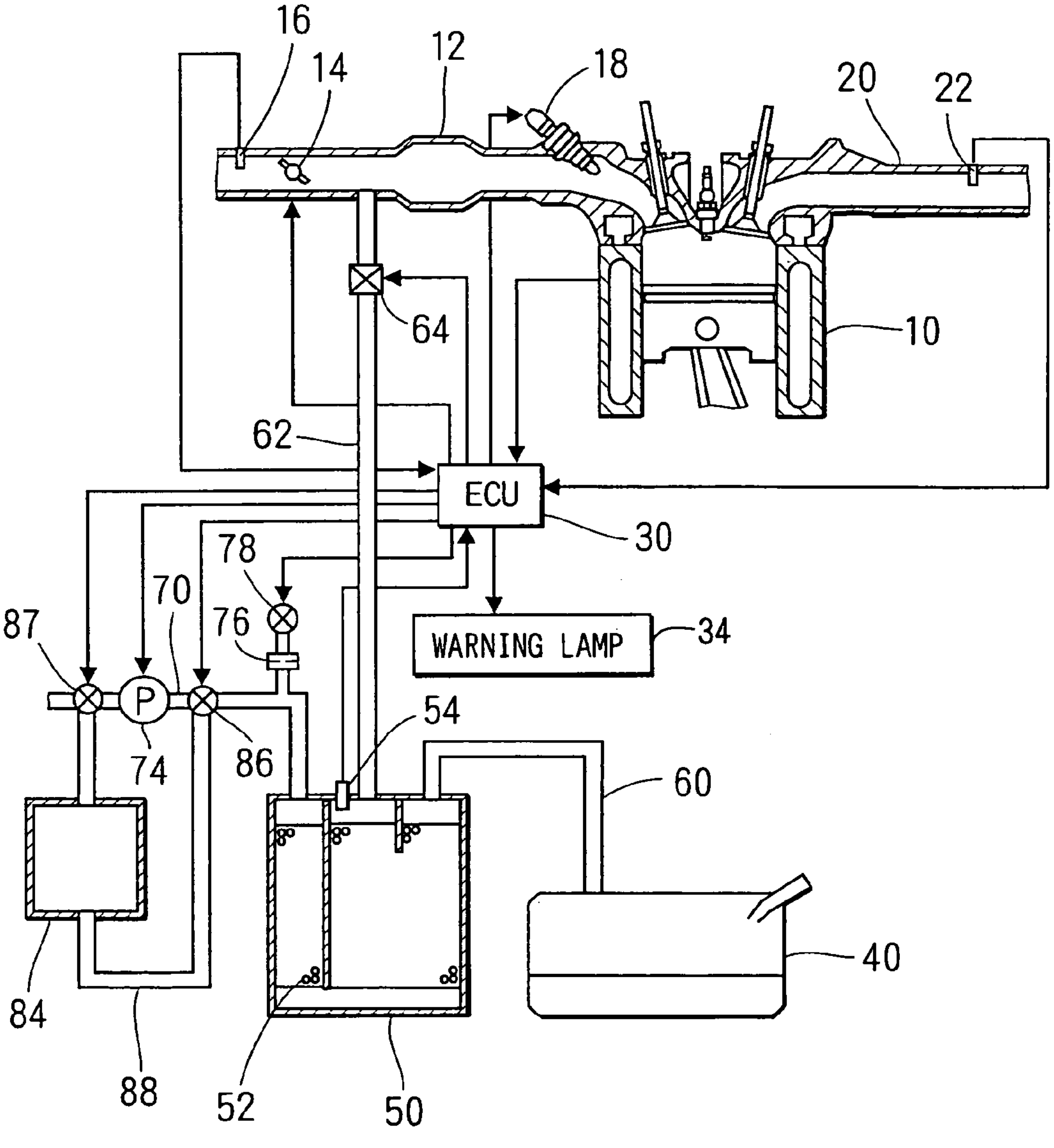
FIG. 18 is a configuration view of a fuel vapor leakage inspection apparatus according to an eighth embodiment of the present invention.

FIG. 18 shows a fuel vapor leakage inspection apparatus according to an eighth embodiment of the present invention. The components of the fuel vapor leakage inspection apparatus of the eighth embodiment that are substantially the same as those of the seventh embodiment are denoted by the same reference numerals.

A switching valve 86 is connected to the pump 74 on its canister 50 side, whereas another switching valve 87 is connected to the pump 74 on its atmosphere side. The sealed container 84 is provided in a negative-pressure introduction pipe 88 connecting the switching valves 86, 87 with each other. The switching valve 86 switches between a first state where the canister 50 and the pump 74 are connected with each other and a second state where the pump 74 and the sealed container 84 are connected with each other. The switching valve 87 switches between a first state where the pump 74 and the sealed container 84 are connected with each other and a second state where the pump 74 and the atmosphere side are connected with each other.

The switching valves 86, 87 are set to be in their second states, respectively, prior to the execution of the leakage inspection. Then, the pump 74, which serves as a negative pressure means, is operated. As a result, the air in the sealed container 84 is drawn by the pump 74 and passes through the switching valve 87 to be exhausted to the atmosphere. Therefore, the pressure in the sealed container 84 becomes negative. By switching the switching valve 86 to the first state when the pressure in the sealed container 84 becomes negative, the pressure in the sealed container 84 can be kept negative.

By setting the switching valves 86, 87 to their first states when the leakage inspection is executed, the fuel vapor, which cannot be adsorbed by the adsorbent 52 in the canister 50, passes through the switching valve 86, the pump 74, and the switching valve 87 so as to be drawn into the sealed container 84. Since the fuel vapor is drawn into the sealed container 84 by the negative pressure, it is not necessary to deliver the fuel vapor into the sealed container 84 by the pump 74. Thus, a discharge pressure of the pump 74 can be lowered as compared with the seventh embodiment.

Even if the fuel vapor is contained in the air exhausted from the pump 74, the fuel vapor is stored in the sealed container 84. When the pump 74 is stopped after the completion of the leakage inspection, the fuel vapor in the sealed container 84 is drawn into the canister 50 whose pressure is reduced by the pump 74. Therefore, the fuel vapor is prevented from flowing out into the atmosphere. Since the leakage inspection can be executed regardless of the amount of the adsorbed fuel vapor in the canister 50, the amount of the adsorbed fuel vapor in the canister 50 is not calculated in the main routine of the leakage inspection in the eighth embodiment as it is in the sixth embodiment.

Figure 32:
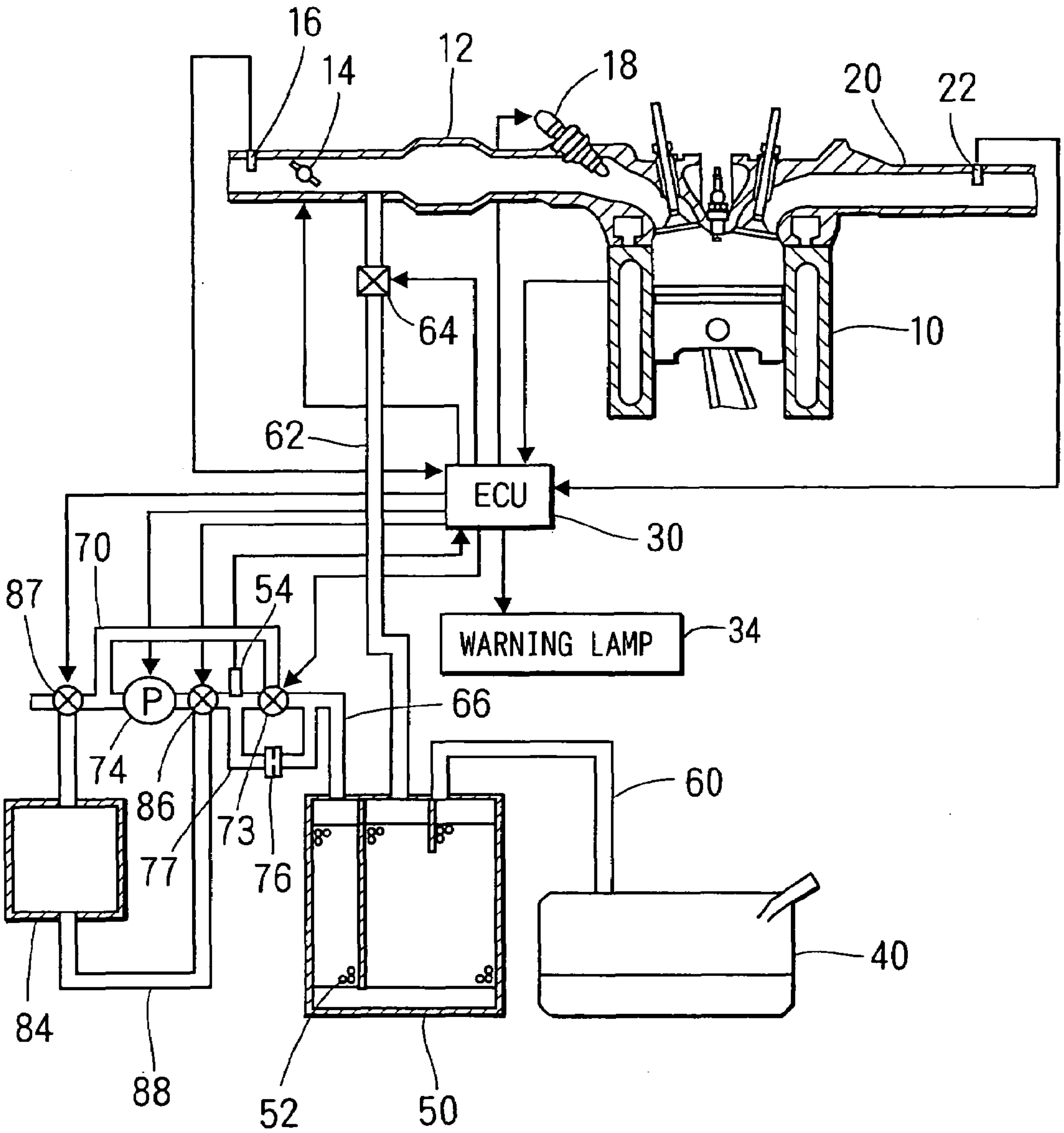
FIG. 32 is a view showing the configuration of a fuel vapor leakage inspection apparatus according to a fifteenth embodiment of the present invention.

The same effects can be obtained even if the configuration of the evaporation system is altered, for example, as shown in FIG. 32 described below as long as the sealed container 84 is connected to the pump 74 on its atmosphere side in a similar configuration.

(Ninth Embodiment)

Figure 19:
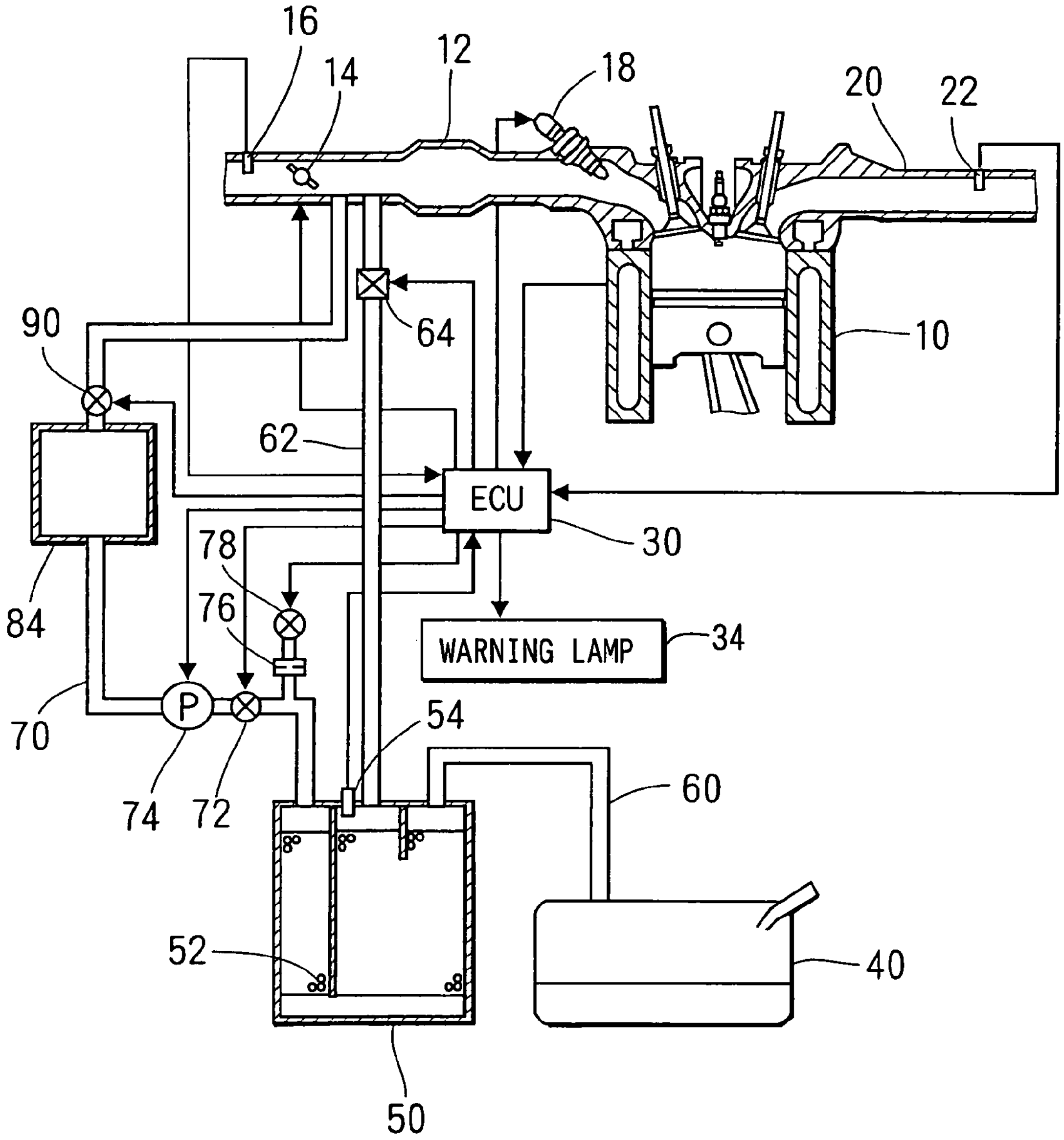
FIG. 19 is a configuration view of a fuel vapor leakage inspection apparatus according to a ninth embodiment of the present invention.

FIG. 19 shows a fuel vapor leakage inspection apparatus according to a ninth embodiment of the present invention. The components of the fuel vapor leakage inspection apparatus according to the ninth embodiment, which are substantially the same as those of the seventh embodiment, are denoted by the same reference numerals.

The pipe 70 connected to the pump 74 is connected to the intake pipe 12 downstream of the throttle device 14. The sealed container 84 is provided in the pipe 70 between the pump 74 and the intake pipe 12. An open/close valve 90 is provided in the sealed container 84 on its intake pipe 12 side.

The open/close valve 90 is opened prior to the execution of the leakage inspection. As a result, the air in the sealed container 84 is drawn into the intake pipe 12 by the negative pressure in the intake pipe 12. Therefore, the pressure in the sealed container 84 becomes negative. When the pressure in the sealed container 84 becomes negative, the open/close valve 90 is closed so as to allow the pressure in the sealed container 84 to be kept negative.

Since the fuel vapor exhausted from the pump 74 is drawn into the sealed container 84 by the negative pressure during the execution of the leakage inspection, it is not necessary to deliver the fuel vapor into the sealed container 84 by the pump 74. Thus, a discharge pressure of the pump 74 can be lowered as compared with the seventh embodiment.

Figure 33:
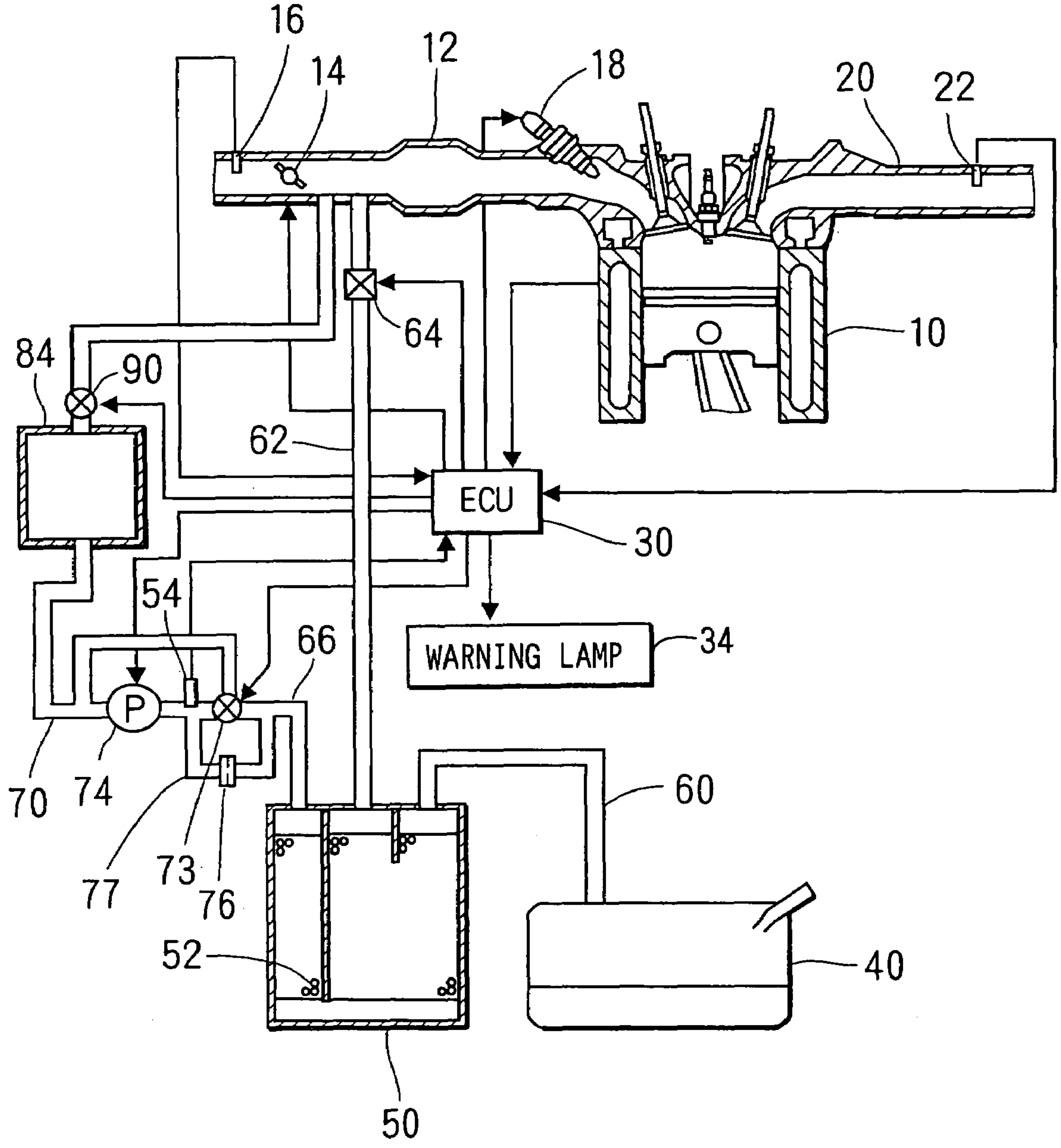
FIG. 33 is a view showing the configuration of a fuel vapor leakage inspection apparatus according to a sixteenth embodiment of the present invention.

Even if the fuel vapor is contained in the air exhausted from the pump 74, the fuel vapor is stored in the sealed container 84. When the pump 74 is stopped after the completion of the leakage inspection, the fuel vapor in the sealed container 84 is drawn into the canister 50 whose pressure is reduced by the pump 74. Therefore, the fuel vapor is prevented from flowing out to the atmosphere. Since the leakage inspection can be executed regardless of the amount of the adsorbed fuel vapor in the canister 50, the amount of the adsorbed fuel vapor in the canister 50 is not calculated in the main routine of the leakage inspection in the ninth embodiment as in the sixth embodiment. The same effects can be obtained even if the configuration of the evaporation system is altered, for example, as shown in FIG. 33 described below as long as the sealed container 84 is connected to the pump 74 on its atmosphere side in a similar configuration.

(Tenth Embodiment)

Figure 20:
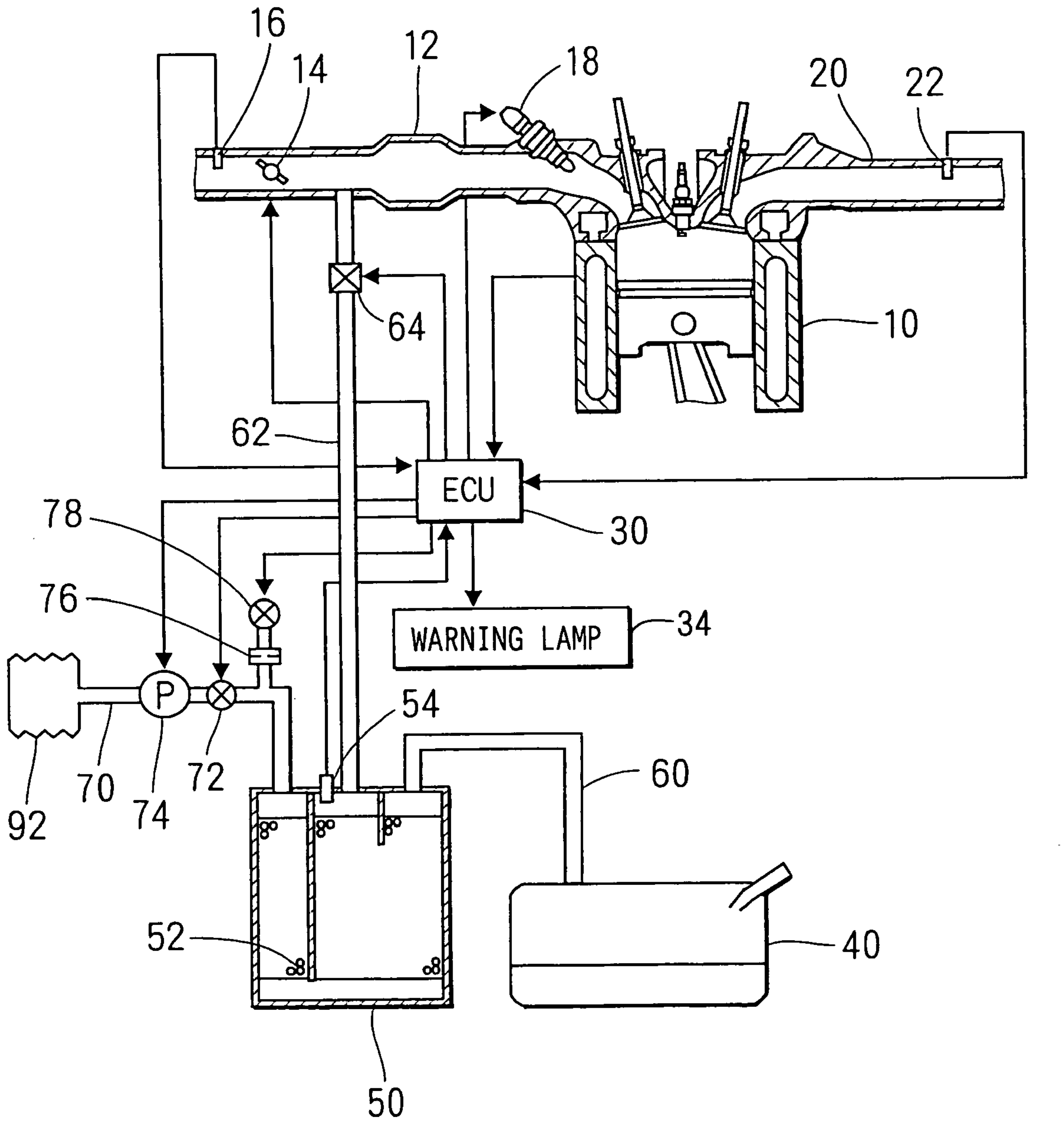
FIG. 20 is a configuration view of a fuel vapor leakage inspection apparatus according to a tenth embodiment of the present invention.

FIG. 20 shows a fuel vapor leakage inspection apparatus according to the tenth embodiment of the present invention. The components of the fuel vapor leakage inspection apparatus according to the tenth embodiment, which are substantially the same as those of the first embodiment, are denoted by the same reference numerals. A bellows-type variable volume container 92 serving as a sealed container is connected to an end of the pipe 70 connected to the pump 74. The variable volume container 92 is capable of increasing and reducing its volume. Instead of the bellows-type container, it is also possible to form a sealed container having a variable volume by using a diaphragm.

Since the volume of the variable container 92 is increased by a discharge pressure of the pump 74 for reducing the pressure in the fuel vapor path during execution of the leakage inspection, the variable container 92 stores the fuel vapor exhausted from the pump 74. The pump 74 can deliver the fuel vapor to the variable container 92 with a small discharge pressure as long as the variable container 92 is formed so that its volume is increased even with a small discharge pressure of the pump 74. Therefore, the discharge pressure of the pump 74 can be reduced as compared with the seventh embodiment.

Even if the fuel vapor is contained in the air exhausted from the pump 74, the fuel vapor is stored in the variable container 92. When the pump 74 is stopped after completion of the leakage inspection, the fuel vapor in the variable container 92 is drawn into the canister 50 whose pressure is reduced by the pump 74. Therefore, the fuel vapor is prevented from flowing out into the atmosphere. Since the leakage inspection can be executed regardless of the amount of the adsorbed fuel vapor in the canister 50, the amount of the adsorbed fuel vapor in the canister 50 is not calculated in the main routine of the leakage inspection in the tenth embodiment as in the sixth embodiment.

Figure 34:
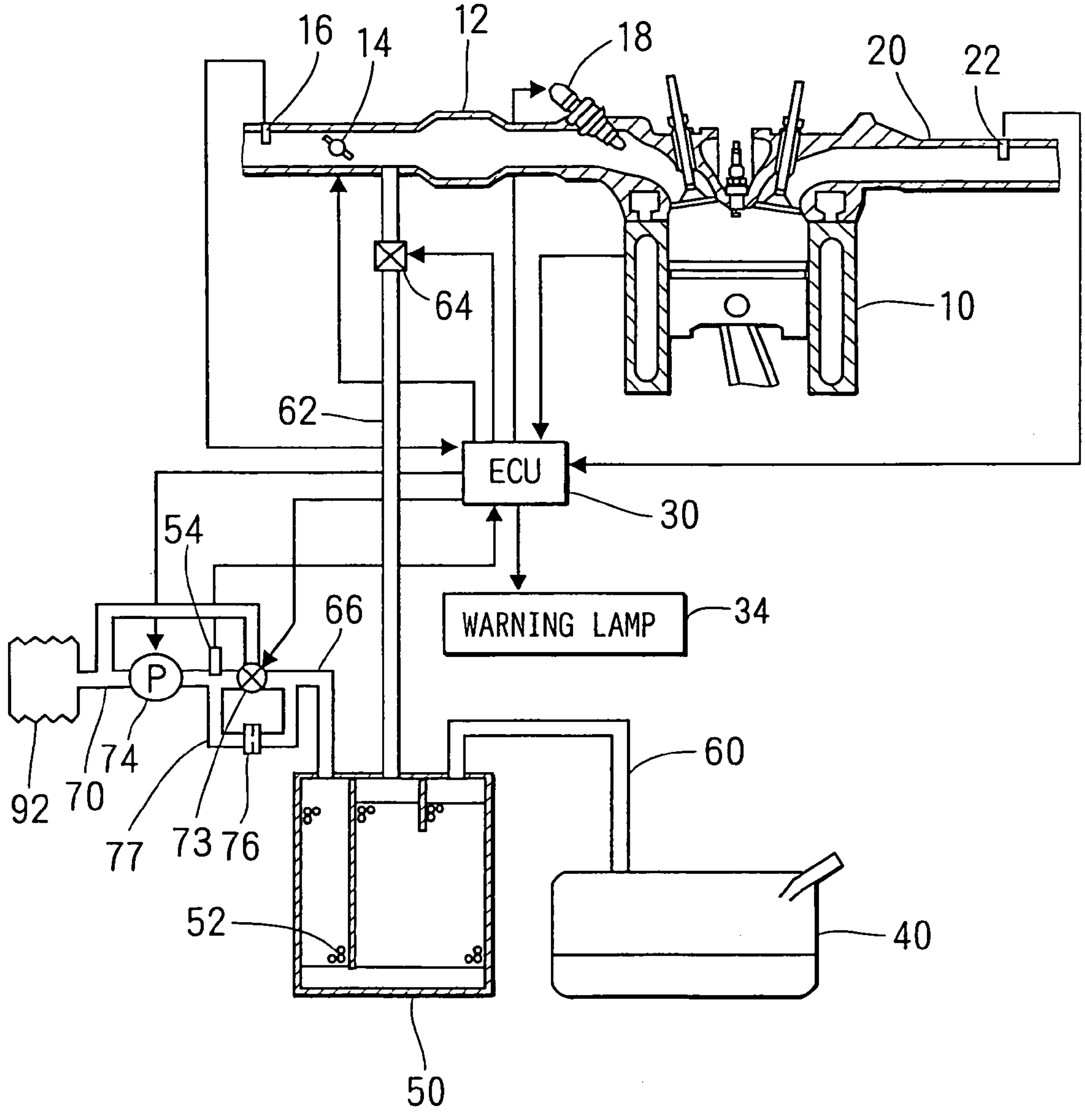
FIG. 34 is a view showing the configuration of a fuel vapor leakage inspection apparatus according to a seventeenth embodiment of the present invention.

The same effects can be obtained even if the configuration of the evaporation system is altered, for example, as shown in FIG. 34 described below as long as the variable container 92 is connected to the pump 74 on its atmosphere side in a similar configuration.

(Eleventh Embodiment)

Figure 21:
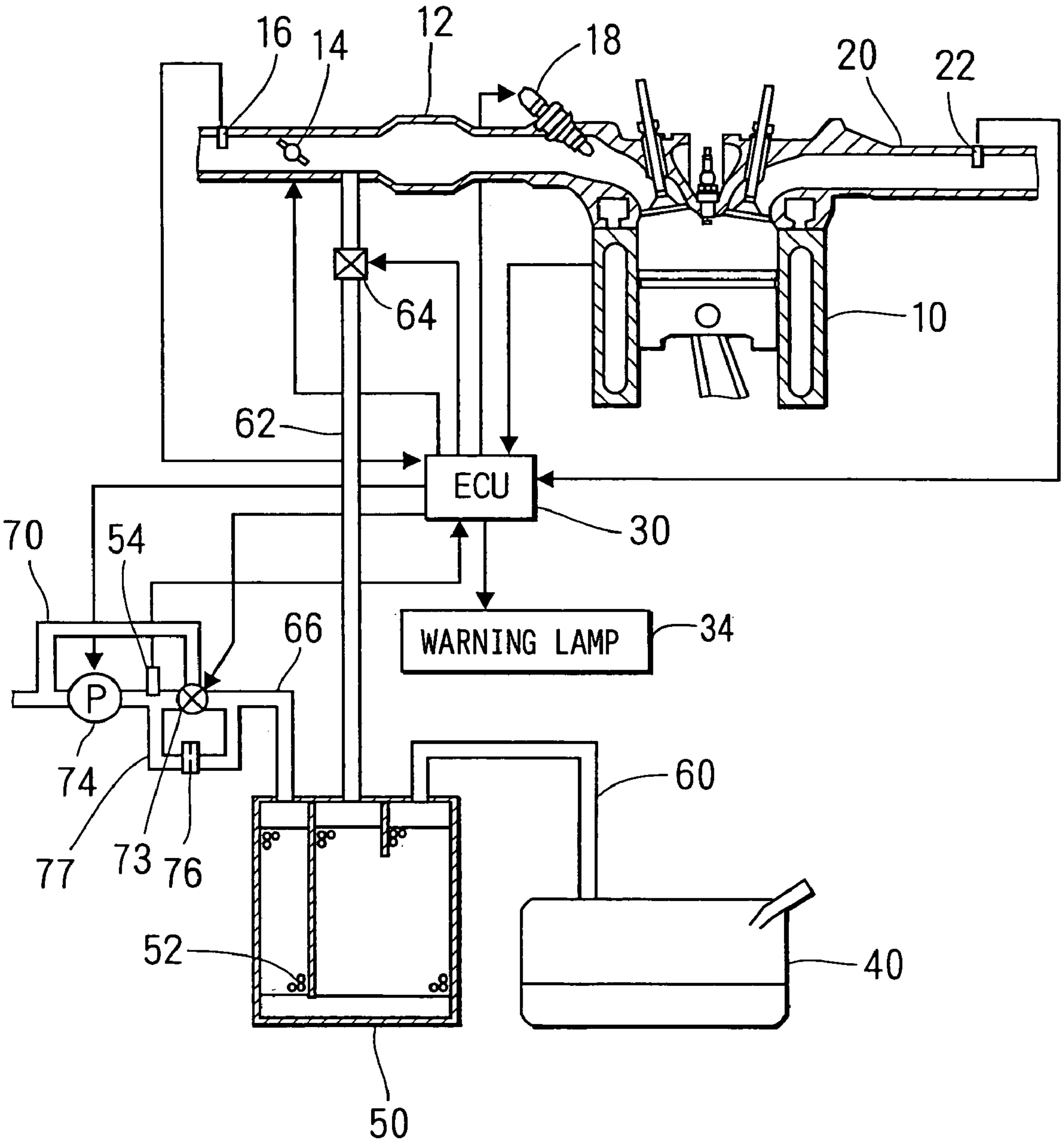
FIG. 21 is a configuration view of a fuel vapor leakage inspection apparatus according to an eleventh embodiment of the present invention.

FIG. 21 shows a fuel vapor leakage inspection apparatus according to an eleventh embodiment of the present invention. The components of the fuel vapor leakage inspection apparatus according to the eleventh embodiment, which are substantially the same as those of the first embodiment, are denoted by the same reference numerals. The pressure sensor 54 serving as a pressure measurement means is provided between the switching valve 73 and the pump 74. The switching valve 73, which is provided in the pipe 66 for connecting the canister 50 and the pump 74 with each other, performs ON and OFF operations by an instruction from the ECU 30 serving as the control means. The switching valve 73 enters a first state where the pipe 66 and the pipe 70 are in communication with each other when it is in an OFF state, whereas the switching valve 73 enters a second state where the pipe 66 and the pump 74 are in communication with each other when it is in an ON state. The reference orifice 76 is provided in the pipe 77 for connecting the pipe 66 and the pump 74 with each other over the switching valve 73 being interposed therebetween.

If the pump 74 is operated while the switching valve 73 is in an OFF state, that is, in the state where the pipe 66 and the pipe 70 are in communication with each other, the air passes through the atmosphere side of the pump 74, the pipe 70, the switching valve 73, the pipe 66, and the reference orifice 76 to be exhausted from the pump 74 to the atmosphere. Therefore, a pressure between the pump 74 and the reference orifice 76 is reduced.

If the pump 74 is operated while the switching valve 73 is in an ON state, that is, in the state where the pipe 66 and the pipe 74 are in communication with each other, the air passes through the fuel tank 40, the pipe 60, the canister 50, the pipe 66, and the switching valve 73 to be exhausted from the pump 74 to the atmosphere. Therefore, the pressure in the fuel vapor path is reduced.

Next, operation of the fuel vapor leakage inspection apparatus will be described with reference to FIGS. 22 to 26. The leakage inspection execution routines shown in FIGS. 25 and 26 are executed in the ECU 30. Since the main routine of the leakage inspection is the same as that in the first embodiment, the description thereof is herein omitted.

Figure 25:
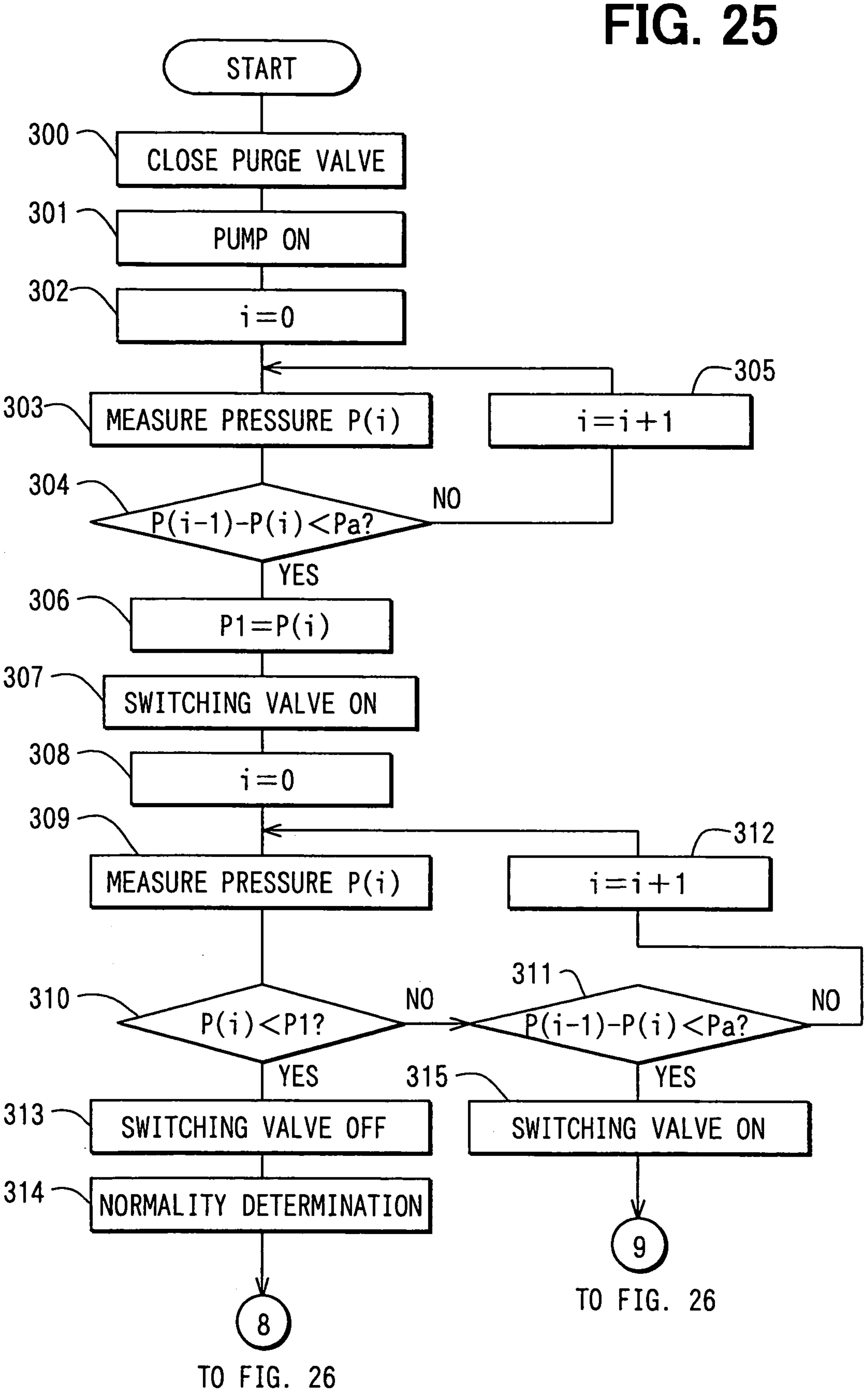
FIG. 25 is a flowchart of the fuel vapor leakage inspection process according to the eleventh embodiment.

When execution of the leakage inspection is allowed in the main routine, the purge valve 64 is closed at step 300 in FIG. 25. Since the switching valve 73 is in an OFF state, the pipe 66 and the pipe 70 are in communication with each other. Next, the pump 74 is turned ON at step 301 to reduce the pressure between the reference orifice 76 and the pump 74 as indicated with interval a–b in FIG. 22. In this time period, the fuel vapor path is not reduced. The pressure sensor 54 measures the pressure of the reference orifice 76.

In a loop formed by steps 303 to 305, when a pressure between the reference orifice 76 and the pump 74 satisfies: $P(i-1)-P(i)<Pa$ to reach a constant pressure, the processing exits the loop so as to set the pressure $P(i)$ at this time as a first reference orifice pressure P1 at step 306.

At step 307, the switching valve 73 is turned ON so that the pipe 66 and the pump 74 are brought into communication with each other. As a result, the pressure in the fuel vapor path that is formed by the fuel tank 40, the pipe 60, the pipe 62, the canister 50, and the pipe 66 is reduced (an interval b–c in FIG. 22). The pressure measured by the pressure sensor 54 is a path pressure in the fuel vapor path.

If the path pressure in the fuel vapor path becomes smaller than the first reference orifice pressure P1 in a loop formed by steps 309 to 312, the switching valve 73 is turned OFF at step 313. Then, at step 314, it is determined that the leakage from the fuel vapor path is small and therefore the state is normal. Subsequently, the pump 74 is turned OFF at step 322 to terminate the leakage inspection execution routine.

If the path pressure in the fuel vapor path does not become smaller than the first reference orifice pressure P1 to reach a constant pressure in the loop formed by steps 309 to 312, the processing exits from the loop to proceed to step 315. The fact that the path pressure in the fuel vapor path reaches a constant pressure without becoming smaller than the first reference orifice pressure P1 means that the leakage from the fuel vapor path is equal to or larger than that from the reference orifice 76.

Figure 23:
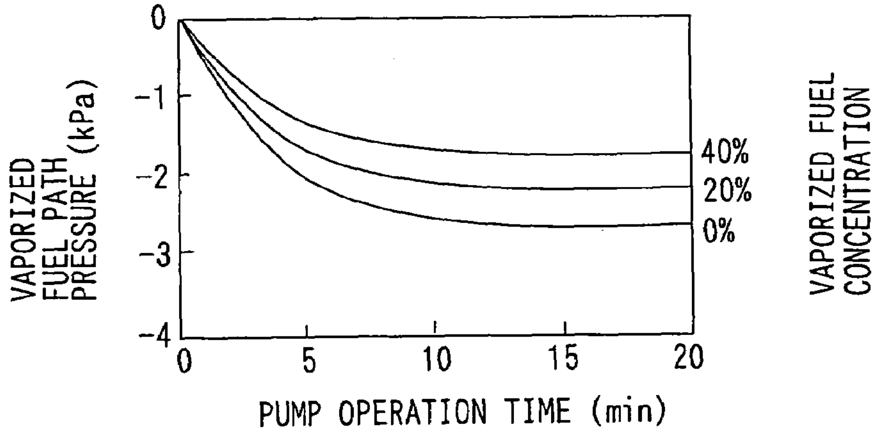
FIG. 23 is a characteristic graph showing the relationship between a pump operation time period and a fuel vapor path pressure in accordance with a fuel vapor concentration in the eleventh embodiment.

However, when the pressure in the fuel vapor path is reduced, the pressure in the fuel tank 40 is also reduced so that the fuel vapor may be further generated from the fuel in the fuel tank 40. In the main routine of the leakage inspection shown in FIG. 4, it is determined that the amount of adsorption M1 in the canister 50, which is allowed when the fuel vapor flows out to the atmosphere prior to the execution of the leakage inspection, is equal to or smaller than the predetermined amount M0, thereby confirming that the adsorbent in the canister 50 has predetermined adsorbability. However, when the pressure in the fuel vapor path is reduced so that the fuel vapor generated from the fuel tank 40 flows out into the canister 50, the adsorbability of the canister 50 is lowered. As a result, the fuel vapor is not adsorbed in the canister 50 so as to be exhausted to the atmosphere in some cases. As shown in FIG. 23, the path pressure in the fuel vapor path, which is measured by the pressure sensor 54, increases as the fuel vapor concentration becomes higher.

The pressure P(i) at step 309, which is measured while the fuel vapor is flowing out from the canister 50 due to lowered adsorbability of the canister 50, includes a factor of the fuel vapor concentration in addition to a factor of the leakage from the fuel vapor path. Therefore, if the measured pressure P(i) in the fuel vapor path is smaller than the first reference orifice pressure P1 at step 310, the leakage from the fuel vapor path is surely smaller than that from the reference orifice 76.

On the other hand, when the measured pressure P(i) in the fuel vapor path reaches a constant pressure without becoming smaller than the first reference orifice pressure P1, two possibilities are considered as a reason. The first possibility is that the leakage from the fuel vapor path is larger than that from the reference orifice 76. The second possibility is that the fuel vapor is flowing out from the canister 50. Therefore, when the measured pressure P(i) in the fuel vapor path reaches a constant pressure without becoming smaller than the first reference orifice pressure P1, the switching valve 73 is turned OFF at step 315 (at c in FIG. 22). Then, the pressure between the pump 74 and the reference orifice 76 is reduced again (interval c–d in FIG. 22).

Figure 22:
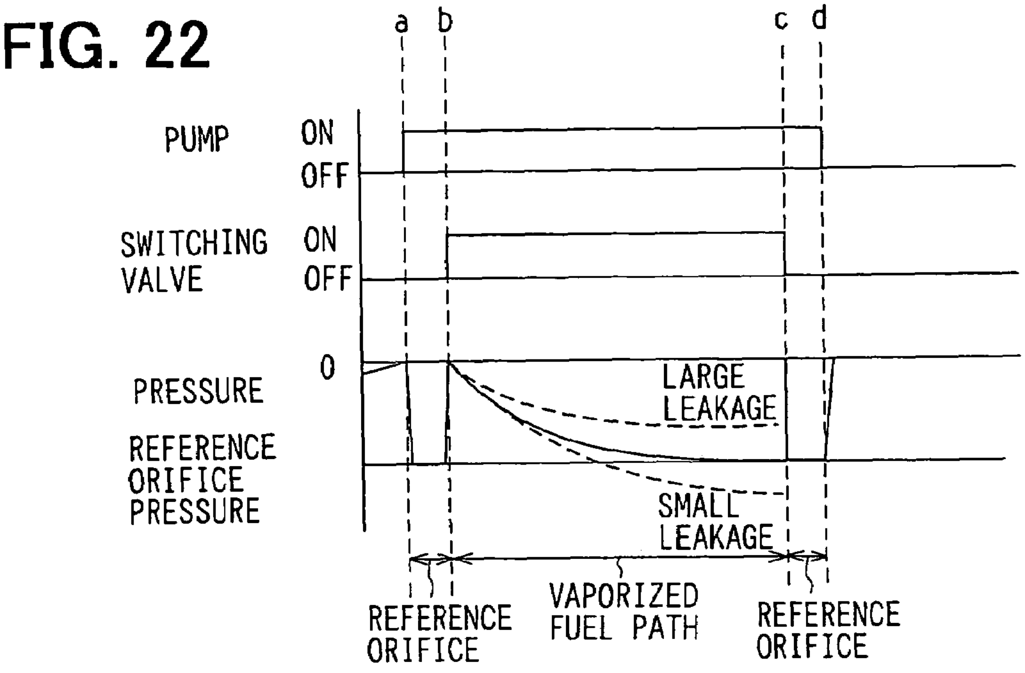
FIG. 22 is a time chart showing a leakage inspection with the fuel vapor leakage inspection apparatus in the eleventh embodiment.
Figure 24:
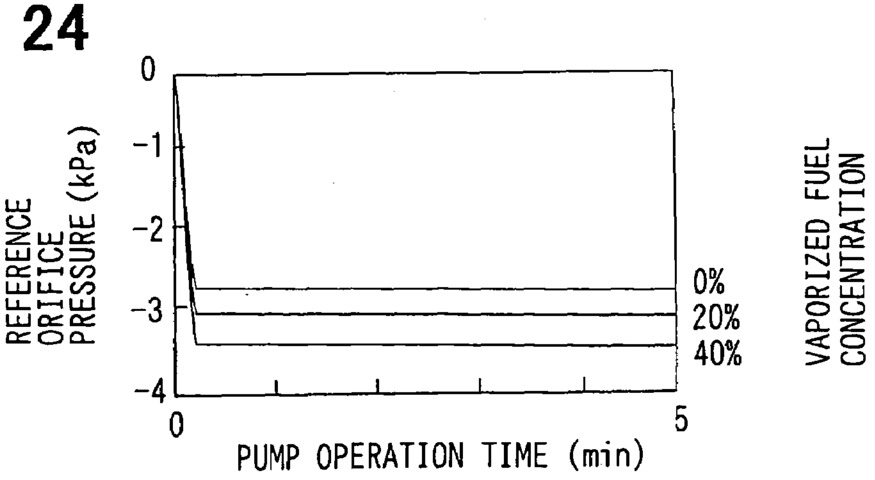
FIG. 24 is a characteristic view showing the relationship between a pump operation time period and a reference orifice pressure in accordance with a fuel vapor concentration in the eleventh embodiment.

The quantity of flow Q of a gas passing through the reference orifice 76 is expressed by the following Formula 2.

$$Q = A \times \alpha \times (2 \times \Delta P/\rho)^{1/2} \qquad \text{[Formula 2]}$$

where A: area of a flow path of the reference orifice 76, α: flow quantity coefficient, ΔP: a difference in pressure between both ends of the reference orifice, and ρ: gas density. When the fuel vapor flows out from the canister 50, the gas density ρ, that is, the fuel vapor concentration, is increased to decrease the quantity of flow Q. When the fuel vapor concentration is increased to decrease the quantity of flow, the pressure in the reference orifice 76, measured by the pressure sensor 54, in the interval c–d in FIG. 22, is lower than that measured when the fuel vapor path is low, as shown in FIG. 24.

Figure 26:
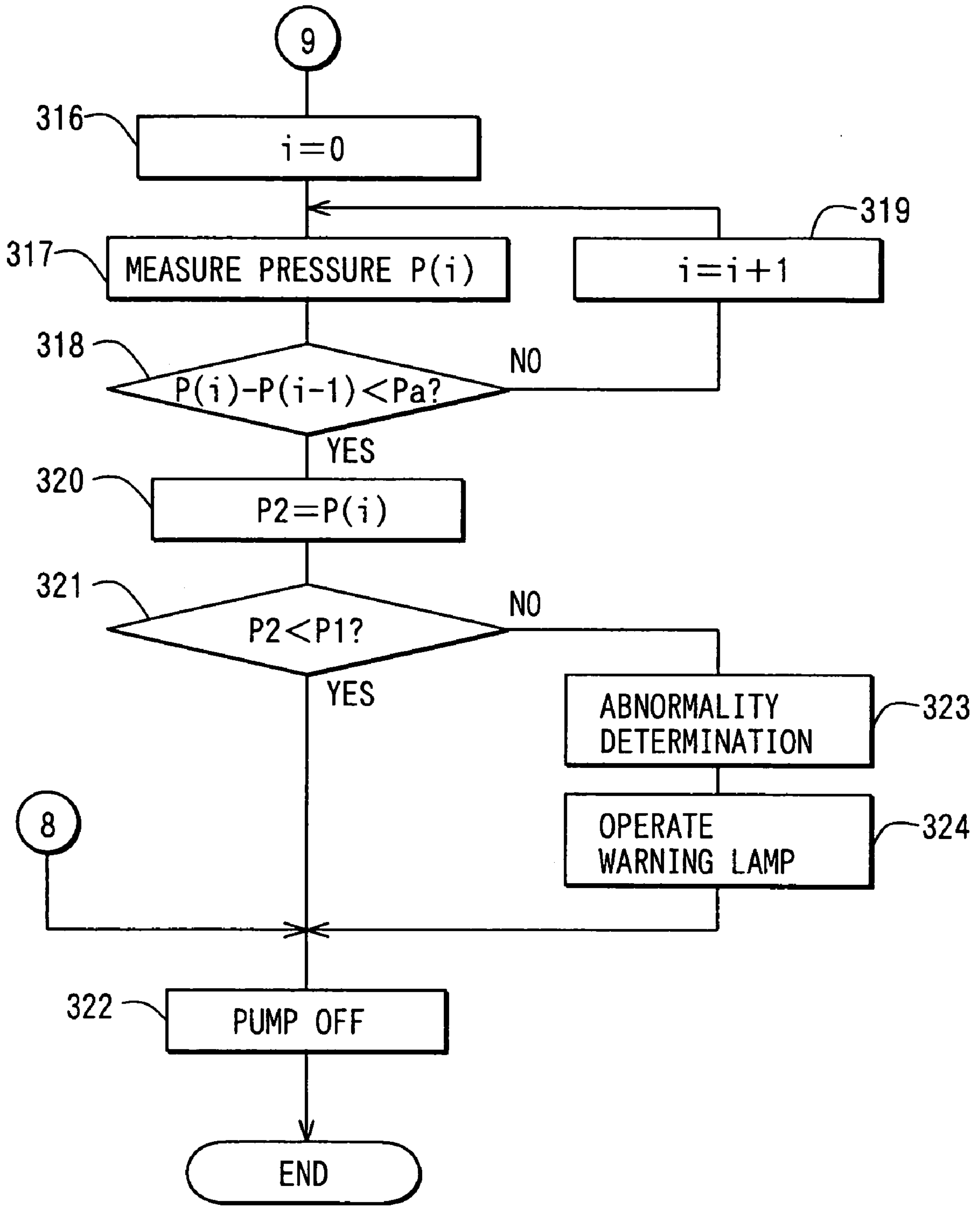
FIG. 26 is a flowchart of the fuel vapor leakage inspection process according to the eleventh embodiment.

In the leakage inspection execution routine shown in FIGS. 25 and 26, when the reference orifice pressure becomes a constant value in a loop formed by steps 317 to 319, the pressure P(i) at that time is set as a second reference orifice pressure P2 at step 321. At step 321, the second reference orifice pressure P2 and the first reference orifice pressure P1 are compared with each other. If P2<P1 is established, it is determined that the second reference orifice pressure P2 becomes lower than the first reference orifice pressure P1 because the fuel vapor flows out from the canister 50 to increase the fuel vapor concentration. Since the path pressure in the fuel vapor path, which is measured in the interval b–c in FIG. 22, is also increased at a high fuel vapor concentration, the occurrence of leakage cannot be precisely determined by comparing the first reference orifice pressure P1 to the path pressure in the fuel vapor path. Therefore, if P2<P1 is established at step 321, the pump 74 is turned OFF at step 322 to stop the leakage determination, thereby completing the leakage inspection execution routine.

At step 321, if the second reference orifice pressure P2 becomes equal to or larger than the first reference orifice pressure P1, it is determined that the fuel vapor does not flow out from the canister 50. The fact that the path pressure in the fuel vapor path does not become smaller than the first reference orifice pressure P1 although the fuel vapor does not flow from the canister 50 means that the leakage larger than that from the reference orifice 76 occurs from the fuel vapor path. Thus, at step 323, it is determined that the leakage occurs from the fuel vapor path and therefore the state is abnormal. The warning lamp 34 is lit at step 324, and then, the pump 74 is turned OFF at step 322 to terminate the leakage inspection execution routine.

In the eleventh embodiment, if it is determined that the fuel vapor flows out from the canister 50 during the execution of the leakage inspection, it is determined that the leakage inspection is not executable to stop the leakage inspection. As a result, it is possible to prevent imprecise leakage determination.

Moreover, in the eleventh embodiment, a concentration of the fuel vapor flowing out from the canister 50 may be calculated based on the amount of a change in pressure between the first reference orifice pressure P1 and the second reference orifice pressure P2. Based on this calculated fuel vapor concentration, the path pressure in the fuel vapor path, which is measured in the interval b–c in FIG. 22, may be corrected. As a result of comparison between the corrected path pressure in the fuel vapor path to the first reference orifice pressure, precise leakage determination can be performed.

(Twelfth Embodiment)

Figure 27:
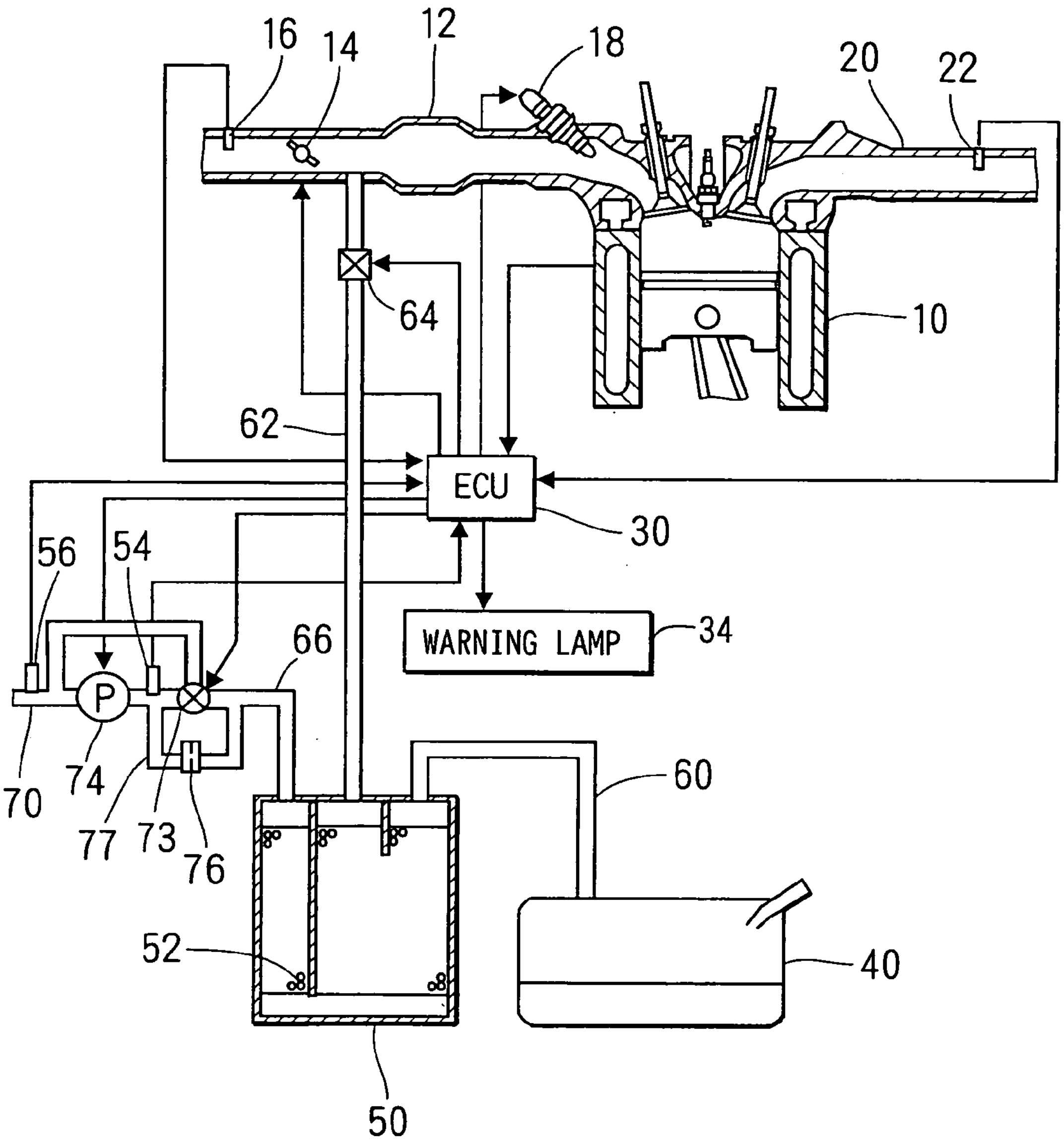
FIG. 27 is a view showing the configuration of a fuel vapor leakage inspection apparatus according to a twelfth embodiment of the present invention.

FIG. 27 shows a fuel vapor leakage inspection apparatus according to a twelfth embodiment of the present invention. The components of the fuel vapor leakage inspection apparatus according to the twelfth embodiment, which are substantially the same as those of the eleventh embodiment, are denoted by the same reference numerals. In the twelfth embodiment, in addition to the configuration of the leakage inspection apparatus in the eleventh embodiment shown in FIG. 21, the concentration sensor 56 is provided on the atmosphere side of the pump 74.

Figure 28:
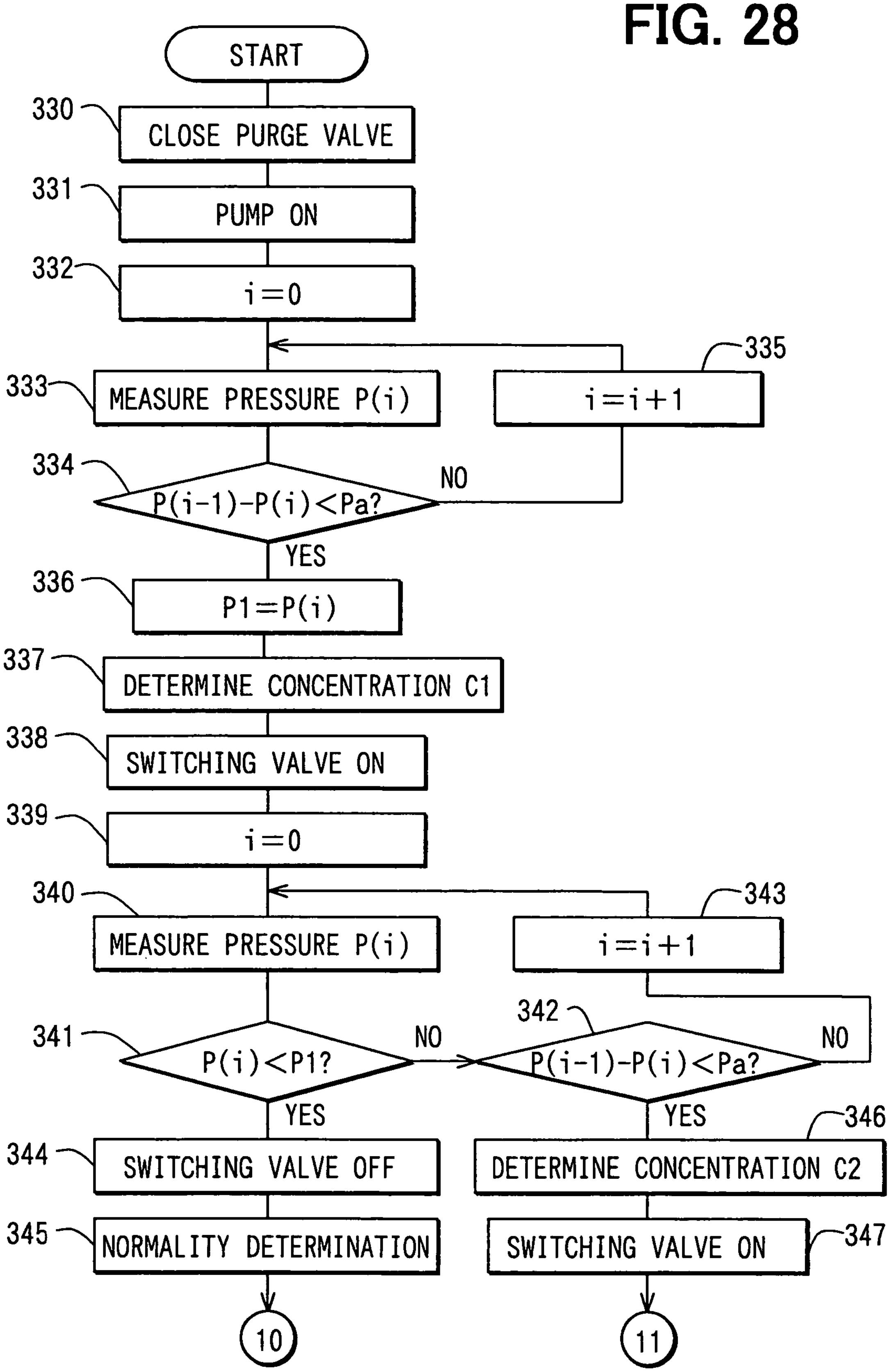
FIG. 28 is a flowchart of a fuel vapor leakage inspection process according to the twelfth embodiment.
Figure 29:
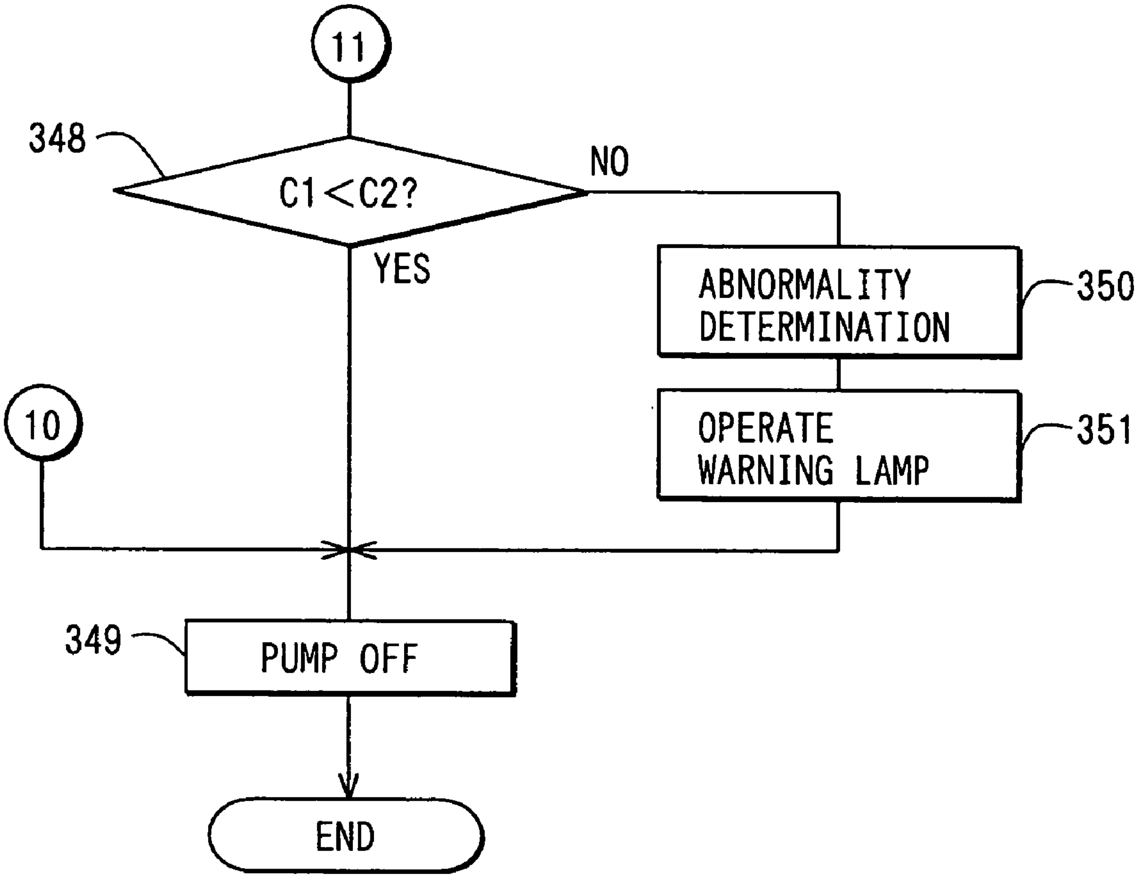
FIG. 29 is a flowchart of the fuel vapor leakage inspection process according to the twelfth embodiment.

Next, an operation of the fuel vapor leakage inspection apparatus will be described with reference to flowcharts of a leakage inspection execution routine shown in FIGS. 28 and 29. Since the main routine of the leakage inspection is the same as that in the first embodiment, repetitious descriptions are not included here. The flowcharts shown in FIGS. 28 and 29 correspond to those shown in FIGS. 25 and 26 in the eleventh embodiment in the following parts: steps 330 to 336 to steps 300 to 306; steps 338 to 343 to steps 307 to 312; and steps 344 and 345 to steps 313 and 314.

In the twelfth embodiment, after the first reference orifice pressure P1 is kept at step 336, the first fuel vapor concentration C1 of the fuel vapor exhausted to the atmosphere is measured by the concentration sensor 56 at step 337. Then, when it is determined that a constant pressure obtained by reducing the pressure in the fuel vapor path is equal to or larger than the first reference orifice pressure P1 in a loop formed by steps 340 to 343, a second fuel vapor concentration C2 of the fuel vapor exhausted to the atmosphere is measured by the concentration sensor 56 at step 346. Then, at step 347, the switching valve 73 is turned OFF.

In the case where it is determined that the second fuel vapor concentration C2 is larger than the first fuel vapor concentration C1 as a result of a comparison therebetween at step 348, it is determined that a precise leakage determination is not executable because the fuel vapor flows out from the canister 50 during the depressurization of the fuel vapor path. Thus, the leakage determination is stopped. Then, at step 349, the pump 74 is turned OFF to terminate the leakage inspection execution routine.

In the case where it is determined that the second fuel vapor concentration C2 is equal to or smaller than the first fuel vapor concentration C1, the fuel vapor does not flow out from the canister 50 during the depressurization of the fuel vapor path. The fact that the pressure in the fuel vapor path does not become smaller than the first reference orifice pressure P1, even when the fuel vapor does not flow out from the canister 50, means that leakage larger than that from the reference orifice 76 occurs from the fuel vapor path. Therefore, it is determined that leakage occurs from the fuel vapor path and therefore the state is abnormal at step 350. The warning light is lit at step 351. Then, the pump 74 is turned OFF at step 349 to terminate the leakage inspection execution routine.

In the twelfth embodiment, if it is determined that the fuel vapor flows out from the canister 50 during the execution of the leakage inspection, the leakage inspection is not executable to stop the leakage inspection. As a result, imprecise leakage determination can be prevented.

Although the concentration sensor 56 is provided on the atmosphere side of the pump 74 in the twelfth embodiment, the concentration sensor 56 can be provided at any position as long as it is positioned on the atmosphere side of the canister 50.

A concentration of the fuel vapor flowing out from the canister 50 is calculated based on the amount of a change in concentration between the first fuel concentration C1 and the second fuel concentration C2 in the twelfth embodiment. Based on the calculated fuel vapor concentration, the pressure in the fuel vapor path, measured at step 340, may be corrected. As a result of comparison between the corrected path pressure in the fuel vapor path and the first reference orifice pressure, precise leakage determination can be performed.

In the above-described eleventh and twelfth embodiments, even during the execution of the leakage inspection execution routine after the ignition key is turned OFF, or even in the case where the fuel vapor flows out from the canister 50 because of lowered adsorbability of the canister during the execution of the leakage inspection so that the leakage cannot be determined, imprecise leakage determination can be prevented. Alternatively, the pressure in the fuel vapor path is corrected based on the fuel vapor flowing out from the canister 50 so as to perform precise leakage determination. Furthermore, the main routines in the third embodiment and the fourth embodiment may be used as the main routines of the leakage inspection execution routines in the eleventh embodiment and the twelfth embodiment.

In the eleventh and twelfth embodiments, the amount of adsorption in the canister 50 is calculated prior to the execution of the leakage inspection during the vehicle stop as in the first embodiment. If the amount of adsorption is equal to or larger than a predetermined amount of adsorption, the leakage inspection is stopped. However, the leakage inspection execution routines described in the eleventh and twelfth embodiments may be executed without calculating the amount of adsorption in the canister 50. Furthermore, the execution of the leakage inspection routine described in the eleventh and twelfth embodiments is not limited to only the vehicle stop; the leakage inspection routine may also be executed while the vehicle is running.

In the eleventh and twelfth embodiments, even when the determination of the leakage from the fuel vapor path is stopped because of lowered adsorbability of the canister 50, the leakage can be precisely determined through the inspection execution routines described in the eleventh and twelfth embodiments if the adsorbability of the canister 50 is restored by purging while the vehicle is running. Although the leakage from the fuel vapor path is inspected based on a change in pressure at the depressurization with the pump 74 in the eleventh and twelfth embodiments, the leakage from the fuel vapor path may be inspected based on a change in pressure when the atmosphere is exhausted from the fuel vapor path after pressurization with the pump 74.

(Thirteenth to Seventeenth Embodiments)

FIGS. 30 to 34 show fuel vapor leakage inspection apparatuses according to thirteenth to seventeenth embodiments of the present invention, respectively. The components of the fuel vapor leakage inspection apparatus, which are substantially the same as those of the first to the twelfth embodiments, are denoted by the same reference numerals. FIG. 30 shows the thirteenth embodiment. The atmosphere side of the pump 74 is opened in the eleventh and twelfth embodiments. In the thirteenth embodiment, however, as in the sixth embodiment, a second adsorbent or the adsorbent 82 serving as an intake adsorbent for adsorbing the fuel vapor is provided upstream of the throttle device 14 provided in the intake pipe 12, independently of the adsorbent serving as the first adsorbent housed within the canister 50. The intake pipe 12, which is positioned between the adsorbent 82 and a combustion chamber of the engine, and the atmosphere side of the pump 74 are connected through the pipe 70 serving as a connection pipe.

Figure 31:
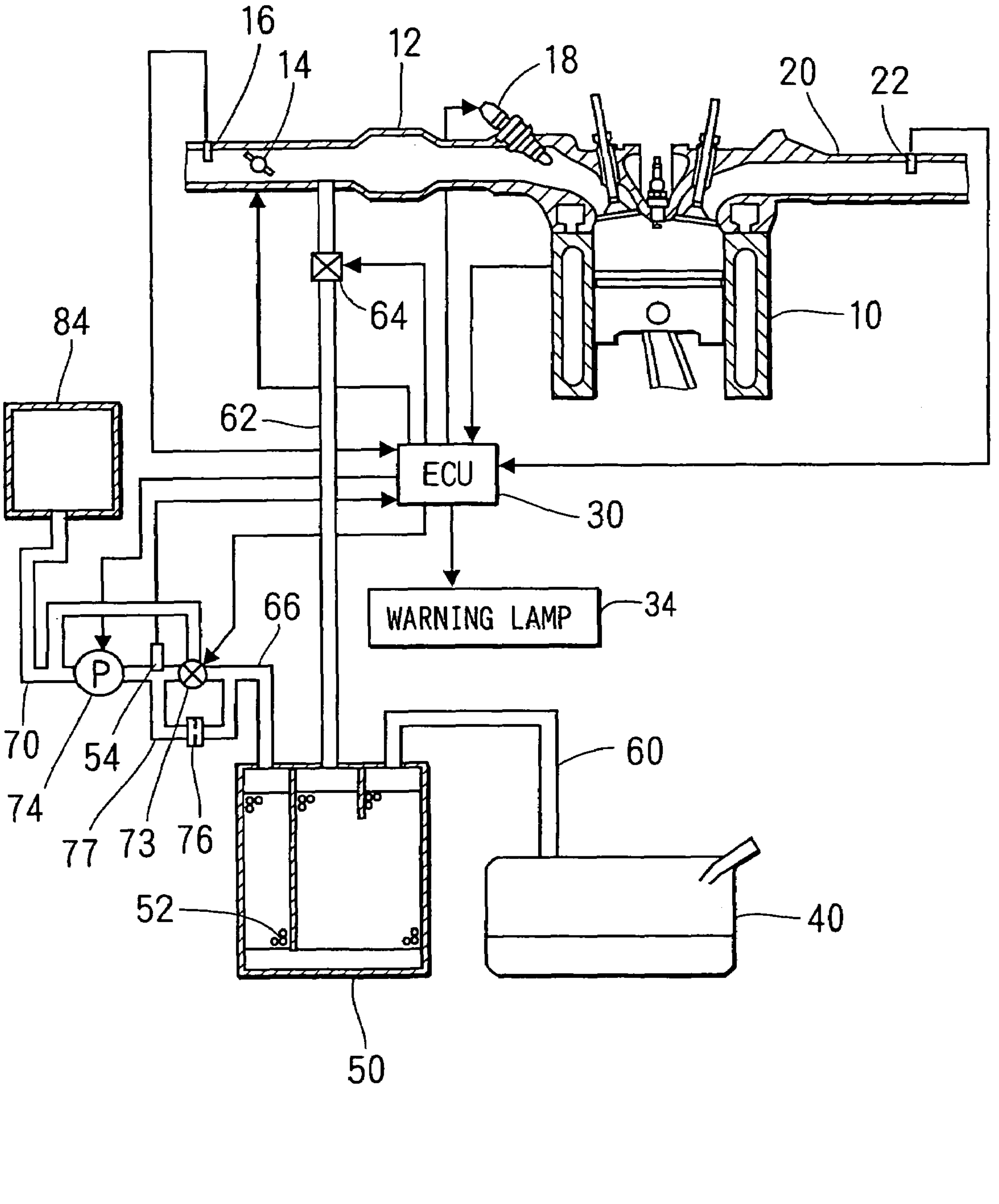
FIG. 31 is a view showing the configuration of a fuel vapor leakage inspection apparatus according to a fourteenth embodiment of the present invention.

In the fourteenth embodiment shown in FIG. 31, the sealed container 84 is connected to the pipe 70 on the atmosphere side of the pump 74 as in the seventh embodiment in configurations of the eleventh and twelfth embodiments. With such a configuration, the fuel vapor is prevented from flowing out into the atmosphere even if the fuel vapor is exhausted from the pump 74 during the execution of the leakage inspection.

In the fifteenth embodiment shown in FIG. 32, as in the eighth embodiment, the switching valve 86 is connected to the canister 50 side of the pump 74, the switching valve 87 is connected to the atmosphere side of the pump 74, and the sealed container 84 for housing the fuel vapor therein is provided in the negative introduction pipe 88 for connecting the switching valves 86, 87 with each other in configurations of the eleventh and twelfth embodiments.

In the sixteenth embodiment shown in FIG. 33, the pipe 70 connected to the atmosphere side of the pump 74 is connected to the suction pipe 12 downstream of the throttle device 14, and the sealed container 84 is provided between the pump 74 of the pipe 70 and the intake pipe 12, as in the ninth embodiment, in the configurations of the eleventh and twelfth embodiments. The open/close valve 90 for stopping or starting communication between the sealed container 84 and the intake pipe 12 is provided for the sealed container 84 on its intake pipe 12 side.

In the seventeenth embodiment shown in FIG. 34, the sealed, bellows-type variable container 92 is connected to the end of the pipe 70 connected to the pump 74 on its atmosphere side so as to store the fuel vapor exhausted from the pump 74 therein as in the tenth embodiment, in configurations of the eleventh and twelfth embodiments.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel vapor leakage inspection apparatus comprising:

a fuel tank;

an adsorption container, wherein said adsorption container houses an adsorbent for adsorbing fuel vapor generated in the fuel tank;

an exhaust device for stopping and starting communication between the adsorption container and an intake pipe, wherein the exhaust device is provided in an exhaust path for exhausting fuel vapor adsorbed by the adsorbent into the intake pipe by a negative pressure of the intake pipe;

pressure means for pressurizing or depressurizing a fuel vapor path formed from the fuel tank through the adsorption container to the exhaust device while the exhaust device blocks communication between the adsorption container and the intake pipe;

leakage detection means for detecting leakage from the fuel vapor path after the fuel vapor path is pressurized or depressurized by the pressure means;

calculation means for calculating an amount of fuel vapor adsorbed; and control means for determining whether or not the pressure means is operated to execute a leakage inspection for the fuel vapor path in accordance with the amount of the fuel vapor calculated by the calculation means.

2. The fuel vapor leakage inspection apparatus according to claim 1, wherein the calculation means calculates the amount of the fuel vapor adsorbed by the adsorbent based on any one of a previous amount of the fuel vapor exhausted into the intake pipe, a concentration of the fuel vapor, and an amount of a deviation in air-fuel ratio generated by exhausting the fuel vapor.

3. The fuel vapor leakage inspection apparatus according to claim 1, wherein the calculation means calculates the amount of the fuel vapor adsorbed by the adsorbent based on at least one of an amount of a fuel in the fuel tank prior to the leakage inspection, a fuel temperature, and a shutdown time period of an internal combustion engine.

* * * * *